United States Patent
Uenohara

(10) Patent No.: US 6,789,656 B2
(45) Date of Patent: Sep. 14, 2004

(54) CLUTCH COVER ASSEMBLY

(75) Inventor: Norihisa Uenohara, Ibaraki (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/366,484

(22) Filed: Feb. 14, 2003

(65) Prior Publication Data

US 2003/0155207 A1 Aug. 21, 2003

(30) Foreign Application Priority Data

Feb. 18, 2002 (JP) ........................................ 2002-039828

(51) Int. Cl.[7] ............................................. F16D 13/75
(52) U.S. Cl. ................................. 192/70.25; 192/111 A
(58) Field of Search ........................... 192/70.25, 111 A

(56) References Cited

U.S. PATENT DOCUMENTS

| | | | | |
|---|---|---|---|---|
| 5,960,926 A | * | 10/1999 | Schubert .................. | 192/111 A |
| 6,029,788 A | | 2/2000 | Weidinger et al. | |
| 6,347,694 B1 | * | 2/2002 | Szadkowski et al. .... | 192/30 W |

FOREIGN PATENT DOCUMENTS

| | | |
|---|---|---|
| DE | 44 14 471 A1 | 11/1995 |
| DE | 196 23 710 A1 | 1/1997 |
| DE | 196 47 974 A1 | 6/1997 |
| DE | 196 54 882 C2 | 9/1997 |
| DE | 197 03 333 A1 | 8/1998 |
| DE | 197 56 726 A1 | 7/1999 |
| DE | 199 10 858 A1 | 12/1999 |
| DE | 199 81 586 T1 | 2/2000 |
| FR | 2 719 097 A1 | 10/1995 |
| FR | 2 781 024 A1 | 1/2000 |
| JP | H9-14288 A | 1/1997 |
| JP | H9-217757 A | 8/1997 |

* cited by examiner

Primary Examiner—Richard M. Lorence
(74) Attorney, Agent, or Firm—Shinjyu Global IP Counselors, LLP

(57) ABSTRACT

A clutch cover assembly 1 having a wear compensating mechanism having accurate wear compensation is provided. In the clutch cover assembly 1, a restricting mechanism 25 restricts movement of a pressure plate 22 away from a friction facing 11 in a clutch release operation. The restricting mechanism 25 is configured to detect an amount of wear of the friction facing 11, and to shift a stopping position of the pressure plate 22 moving away from the friction facing 11 in accordance with the wear amount toward the friction facing 11. A strap plate 26 biases the pressure plate 22 away from the friction facing 11. A leaf spring 35 axially biases the pressure plate 22 and the fulcrum ring 23 toward each other.

21 Claims, 27 Drawing Sheets

Fig. 27
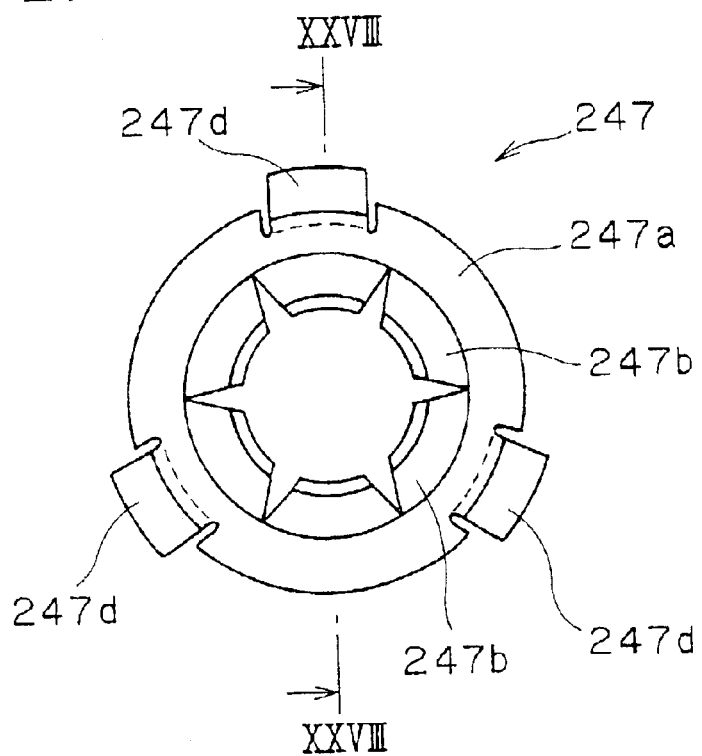
Fig. 28
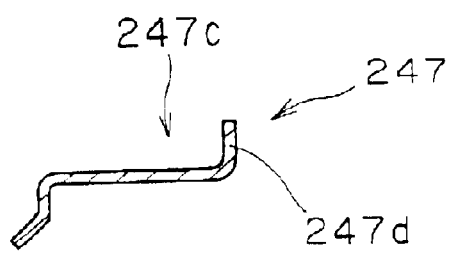
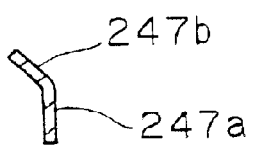

CLUTCH COVER ASSEMBLY

BACKGROUND OF THE INVENTION

1. Field of the Invention

The present invention generally relates to a clutch cover assembly. More specifically, the present invention relates to a clutch cover assembly provided with a wear compensating mechanism for maintaining a pressing load in an initial state independently of wear of a friction member.

2. Background Information

A conventional clutch cover assembly of a clutch device is attached to a flywheel of an engine, and utilizes a spring force from a diaphragm spring to push a friction member of a clutch disk assembly against the flywheel to transmit a driving power from the engine toward a transmission. In this clutch device, when the friction member is worn by a predetermined amount or more, the friction member can no longer be used, or the position or attitude of the diaphragm spring of the clutch cover changes to cause a disadvantageous change in the pushing load. Accordingly, the clutch disk assembly must be replaced with a new one. Thus, there has been a demand to extend the period before this replacement and therefore to extend the life span of the clutch.

To provide a clutch with a long life span, it is important in the clutch disk assembly to increase an effective thickness of the friction member. Accordingly, approaches such as fixing friction members to a cushioning plate without using a rivet or the like have been tried.

In a clutch cover assembly, it is necessary to restore the attitude of a diaphragm spring to an initial state when the friction facing is worn. For this purpose, the clutch cover assembly is configured to determine an amount the friction facing wears, and to move a member supporting the diaphragm spring (i.e., a fulcrum ring on the pressure plate side, or a support mechanism on the clutch cover side) in accordance with the wear amount. Thereby, the friction facing of the clutch disk assembly can be used to a maximum extent.

Japanese Laid-Open Patent Publication No. H10-227317 discloses a clutch cover assembly that has a wear compensating mechanism, a biasing mechanism, and a restricting mechanism. The wear compensating mechanism primarily has a fulcrum ring arranged between a clutch cover and a diaphragm spring. The biasing mechanism biases the fulcrum ring away from a pressure plate. The restricting mechanism prevents separation of the fulcrum ring from the pressure plate and allows the fulcrum ring to move axially a distance with respect to the pressure plate. The distance corresponds to an amount of wear that has occurred on the friction facing.

A conventional friction amount detecting mechanism has an axial movement restricting portion for restoring the desired amount of axial movement, e.g., of the pressure plate with respect to the clutch cover in accordance with the wear amount. When wear occurs in the clutch engaged state, the axial movement restricting portion will operate in the next release operation to reduce the distance of movement of the pressure plate by an amount corresponding to the wear. Consequently, when the pressure plate is in the released position, the fulcrum ring is spaced from the pressure plate by a distance increased by the wear amount. After the wear is compensated, therefore, the fulcrum ring axially returns to the initial position so that the attitude or inclination of the diaphragm spring does not change.

Japanese Laid-Open Patent Publication Nos. H9-217757 and H9-14288 disclose wear compensating mechanisms that have a stopper mechanism. The stopper mechanism is provided to prevent over-adjustment (i.e., movement of the fulcrum ring away from the pressure plate by an amount larger than the wear amount) by keeping the fulcrum ring in contact with the clutch cover.

In the stopper mechanisms described above, however, when vibrations are applied to the clutch cover assembly during the clutch release operation, the pressure plate may receive a load acting to move it away from the fulcrum ring. Thereby, the pressure plate moves away from the fulcrum ring. If the fulcrum ring is spaced from the pressure plate by an amount larger than the wear amount, wear compensation cannot be accurately performed. In other words, over-adjustment can occur.

In view of the above, it will be apparent to those skilled in the art from this disclosure that there exists a need for an improved clutch cover assembly having a wear compensation mechanism. This invention addresses this need in the art as well as other needs, which will become apparent to those skilled in the art from this disclosure.

SUMMARY OF THE INVENTION

An object of the present invention is to provide a clutch cover assembly having a wear compensating mechanism, which can perform accurate wear compensation.

A clutch cover assembly in accordance with a first aspect of the present invention is configured to bias a friction facing of a clutch disk assembly toward a flywheel for engaging a clutch. The clutch cover assembly includes a clutch cover, a pressure plate, a pushing member, a biasing mechanism, a restricting mechanism, a first elastic member, and a second elastic member. The clutch cover is fixed to the flywheel. The pressure plate neighbors the friction facing, and has a first side surface opposed to the friction facing and a second side surface on the opposite side. The fulcrum ring is arranged on the side of the second side surface of the pressure plate. The pushing member is supported by the clutch cover for applying a pushing force to the fulcrum ring toward the pressure plate. The biasing mechanism applies a load to the fulcrum ring to bias the fulcrum ring away from the pressure plate. The restricting mechanism restricts movement of the pressure plate away from the friction facing in a clutch release operation, and is configured to detect an amount of wear of the friction facing. The restricting mechanism is configured to shift a stopping position of the pressure plate that has moved away from the friction facing in accordance with the wear amount toward the friction facing. The first elastic member biases the pressure plate away from the friction facing. The second elastic member biases the pressure plate and the fulcrum ring axially toward each other.

According to this clutch cover assembly, when wear occurs on the friction facing, the pressure plate and the fulcrum ring move relatively to the clutch cover toward the flywheel. When the pushing load applied by the pushing member is released from the pressure plate, the load applied by the first elastic member moves the pressure plate away from the friction facing. In this operation, the restricting mechanism stops the pressure plate at a position shifted from a position where the pressure plate was stopped before the wearing toward the friction facing by a distance or amount corresponding to the wear amount. Therefore, the fulcrum ring can axially move a distance corresponding to the wear amount after the pressure plate has stopped. Consequently, wear of the friction facing is compensated, and the attitude of the pushing member in the pushing position is restored to the attitude before the wearing.

In this clutch cover assembly, the second member biases the pressure plate and the fulcrum ring toward each other. The biasing suppresses axial movement of the pressure plate away from the fulcrum ring even when the pressure plate undergoes an acceleration due to vibrations applied to the clutch cover assembly during the clutch release operation. Thus, the over-adjustment phenomenon is suppressed in the clutch cover assembly of the present invention.

A clutch cover assembly in accordance with a second aspect of the present invention is the clutch cover assembly of the first aspect that further has such a feature that the pushing member is configured to apply a load in a direction opposite to the biasing direction of a portion of the second elastic member that biases the fulcrum ring when releasing the pushing force. This clutch cover assembly can reliably space the fulcrum ring from the pressure plate in the release operation after occurrence of wear even if the biasing force of the second elastic member is set larger than the load of the biasing mechanism for suppressing the over-adjustment.

A clutch cover assembly in accordance with a third aspect of the present invention is the clutch cover assembly of the second aspect that further has such a feature that the second elastic member is a plate spring. The second elastic member biases the pressure plate toward the fulcrum ring via a pushing portion of the pushing member. According to this clutch cover assembly, the pushing member moves the second elastic member away from the fulcrum ring in the clutch release operation. Therefore, the fulcrum ring can be spaced from the pressure plate in accordance with the wear amount in the release operation after the wear has occurred.

A clutch cover assembly in accordance with a fourth aspect of the present invention is the clutch cover assembly of the second aspect that further has such a feature that the second elastic member is in direct contact with the fulcrum ring, and the fulcrum ring is engaged with the pushing portion of the pushing member. According to this clutch cover assembly, the pushing member moves the fulcrum ring away from the pressure plate in the clutch release operation. Therefore, the fulcrum ring can be spaced from the pressure plate in accordance with the wear amount in the release operation after the wear has occurred.

A clutch cover assembly in accordance with a fifth aspect of the present invention is the clutch cover assembly of any one of the preceding aspects that has a feature such that the pushing member is a diaphragm spring having an annular elastic portion and a plurality of lever portions extending radially inward from the elastic portion. According to this clutch cover assembly, the annular elastic portion of the diaphragm spring pushes the pressure plate to engage the clutch, and the plurality of lever portions of the diaphragm spring are operated to release the pushing force of the elastic portion from the pressure plate.

A clutch cover assembly in accordance with a sixth aspect of the present invention is the clutch cover assembly of any one of the preceding aspects that further has a feature such that the pushing member stops the movement of the fulcrum ring away from the pressure plate during the wear compensating operation in the clutch release operation.

According to this clutch cover assembly, it is the pushing member instead of the clutch cover that prevents the movement of the fulcrum ring in the wear compensating operation. Therefore, not only the wear of the friction facing but also the wear of the fulcrum and support portions of various members are compensated so that the pushing member can always keep a constant attitude and position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 27 is an elevational view of a washer of a restricting mechanism of the clutch cover assembly of FIG. 24;

FIG. 28 is a cross-sectional view of the washer taken along line XXVIII—XXVIII in FIG. 27.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

1. First Embodiment (1) Structure

Figure 1:
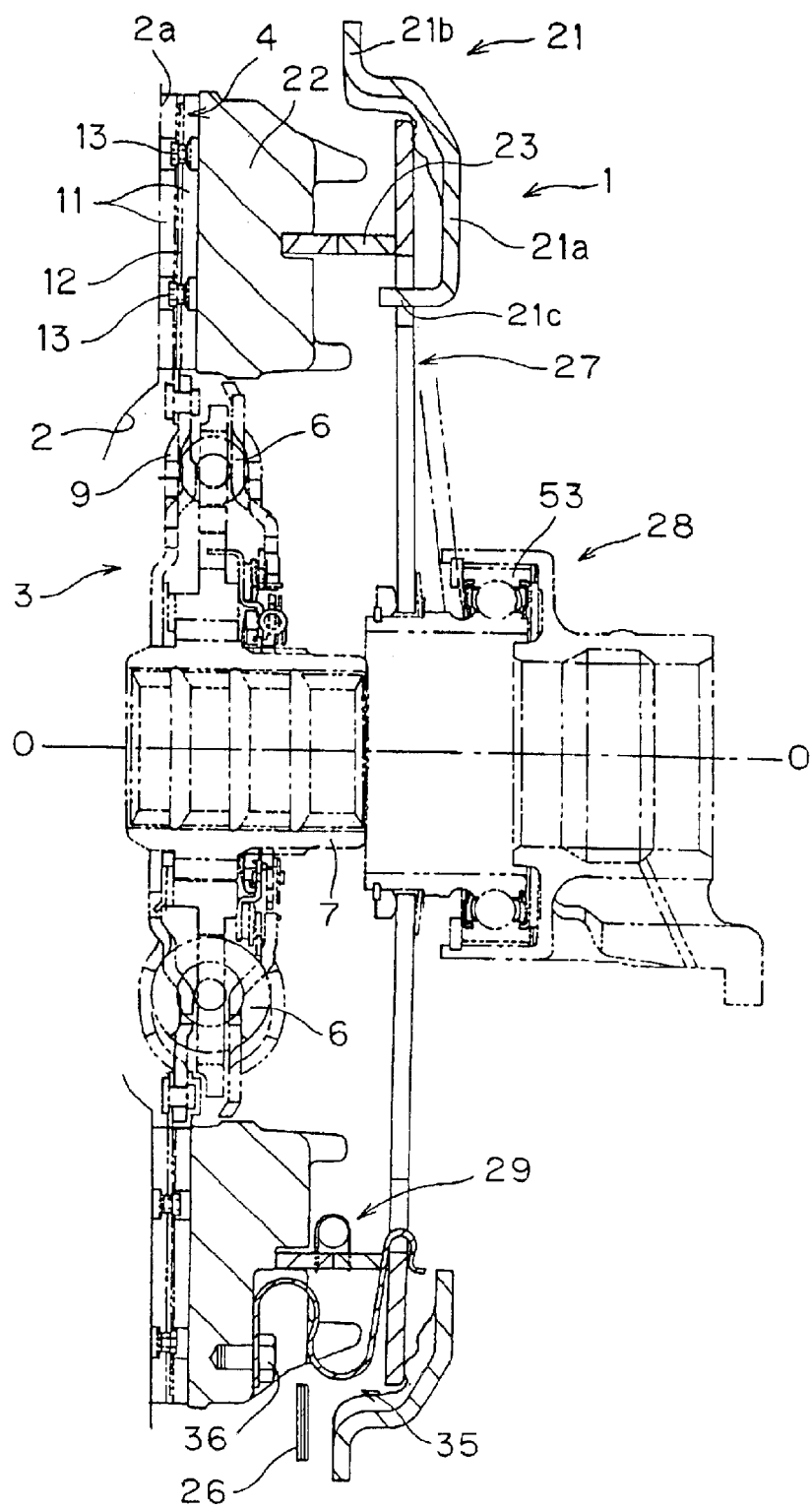
FIG. 1 is a schematic cross-sectional view of a clutch device in accordance with a preferred embodiment of the present invention taken along angle I-0-I' in FIG. 2.
Figure 2:
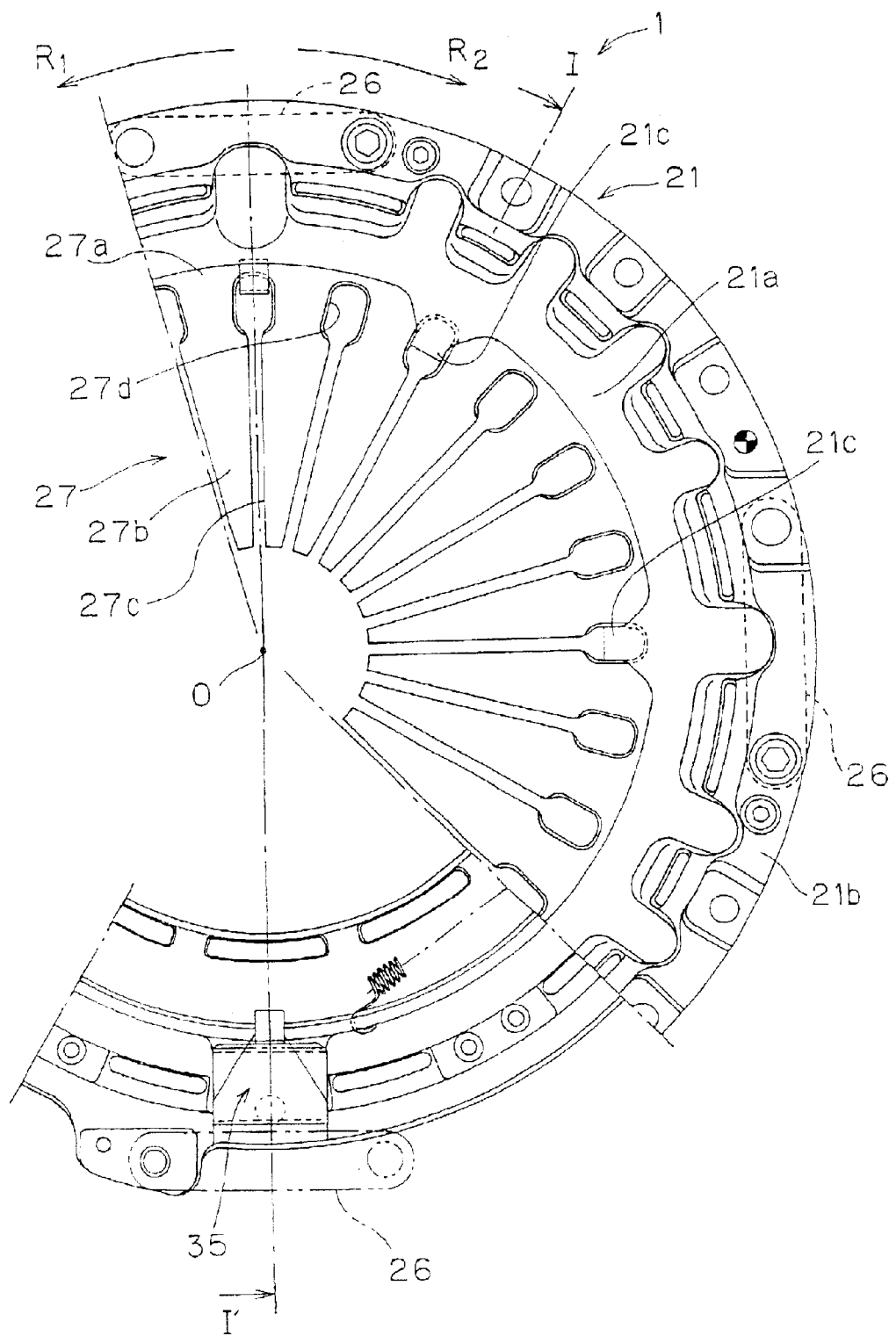
FIG. 2 is a partial elevational view of the clutch cover assembly with sections removed for illustrative purposes.

FIGS. 1 and 2 show a clutch cover assembly 1 in accordance with a preferred embodiment of the present invention. In FIG. 1, an engine (not shown) is arranged on the left side, and a transmission (not shown) is arranged on the right side. In FIG. 1, line O—O represents a rotational axis of the clutch cover assembly, and an arrow R1 in FIG. 2 indicates a positive rotation direction of the clutch cover assembly 1. An arrow R2 indicates a negative rotation direction of the clutch cover assembly 1 and a rotation direction of a rotary plate 32, which will be described later, in a wear adjusting operation.

Referring to FIG. 1, the clutch cover assembly 1 is a device that selectively transmits a torque, which is transmitted from a flywheel 2 of an engine of a vehicle, to a clutch disk assembly 3. The clutch cover assembly 1 is attached to the flywheel 2. The clutch cover assembly 1 is of a so-called pull type, in which an inner periphery of a diaphragm spring is axially pulled toward the transmission for releasing the clutch.

The clutch disk assembly 3 is primarily formed of a clutch disk 4 and a hub 7. The hub 7 is coupled to the clutch disk 4 via coil springs 6. The clutch disk 4 is formed of a pair of circular friction facings 11, cushioning plates 12 arranged therebetween, and rivets 13. The rivets 13 fix the circular friction facings 11 to the cushioning plate 12. The clutch disk 4 neighbors a friction surface 2a of the flywheel 2.

The clutch cover assembly 1 is primarily formed of a clutch cover 21, a pressure plate 22, a fulcrum ring 23, a diaphragm spring 27, strap plates 26, a release device 28, and a wear compensating mechanism 29. The wear compensating mechanism 29 includes a biasing mechanism 24 and a restricting mechanism 25, which will be described later.

Figure 4:
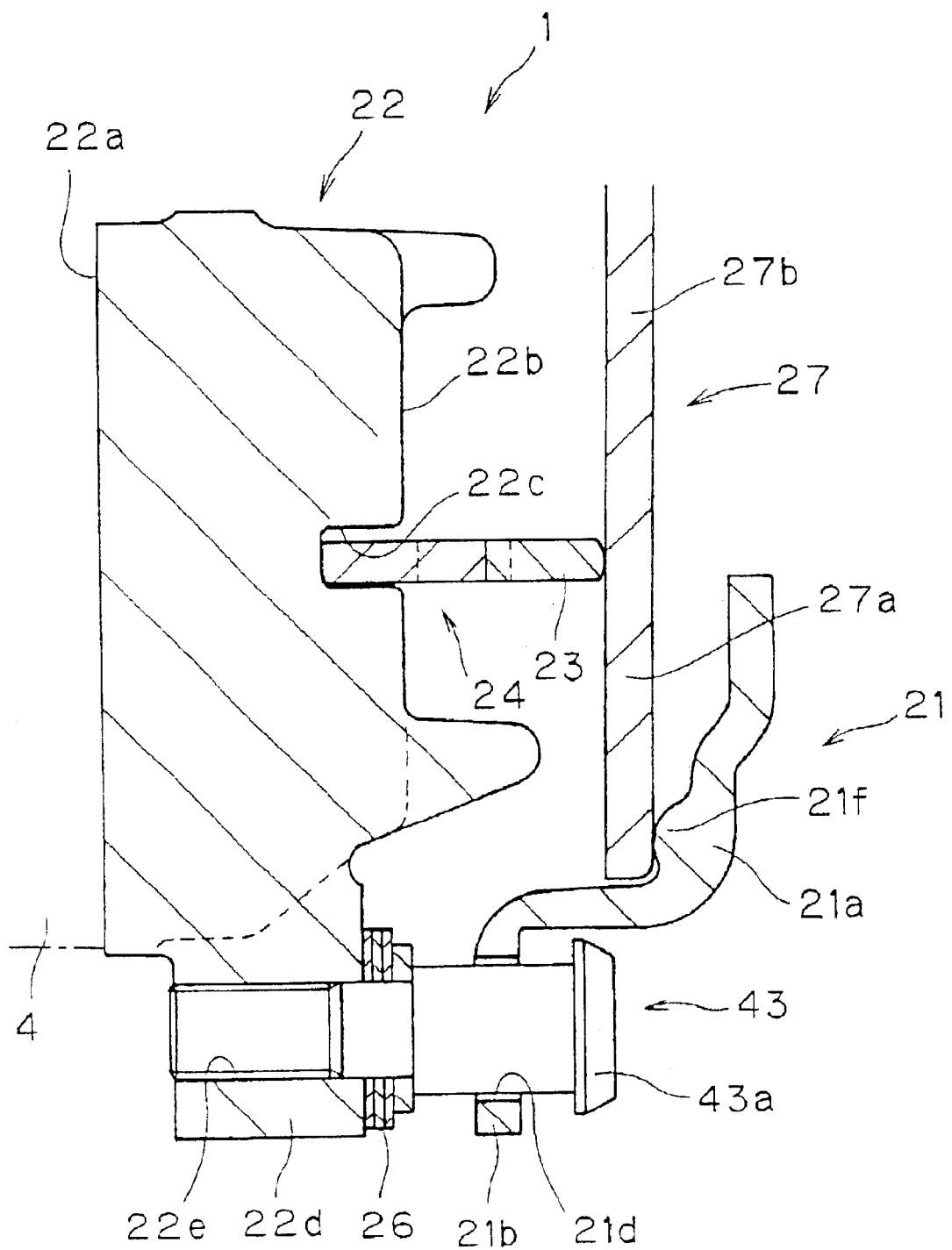
FIG. 4 is a fragmentary schematic cross-sectional view of the clutch cover assembly taken along line IV—IV in FIG. 16.
Figure 10:
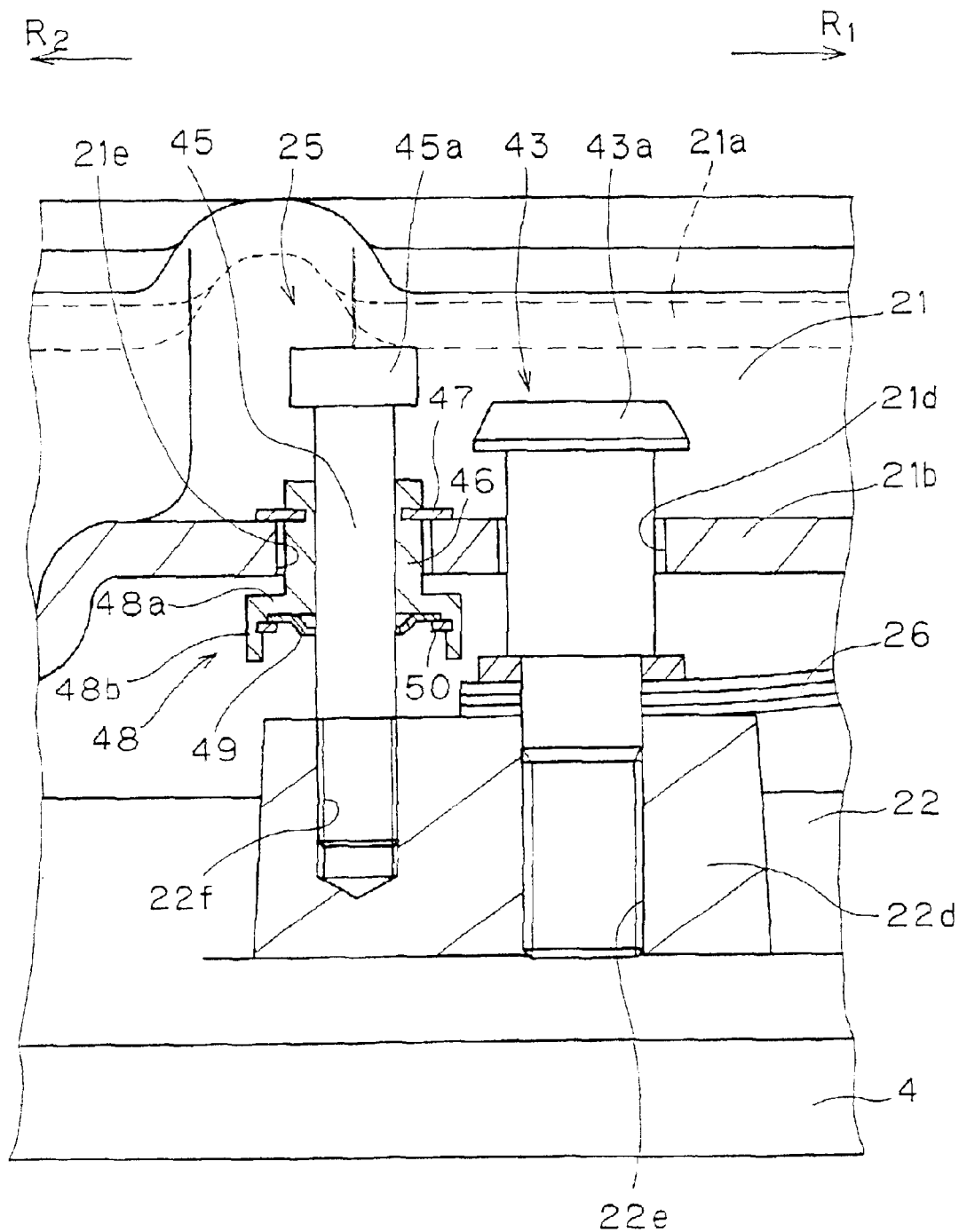
FIG. 10 is an enlarged fragmentary view of a structure in FIG. 9.

The clutch cover 21 is a disk-like member attached to the flywheel 2. The clutch cover 21 is a circular plate member disposed on a transmission side of the clutch disk assembly 3. The clutch cover 21 has a radially inner portion 21a and a radially outer portion 21b. The radially outer portion 21b is fixed to the outer peripheral portion of the flywheel 2 via members (not shown). As seen in FIG. 4, the radially outer portion 21b is provided at its outer peripheral portion with a plurality of, preferably four, first axial apertures 21d, which are circumferentially equally spaced from each other. Further, as shown in FIG. 10, the radially outer portion 21b is provided with second axial apertures 21e aligned with or shifted from the apertures 21d in the circumferential direction R2, respectively.

Figure 3:
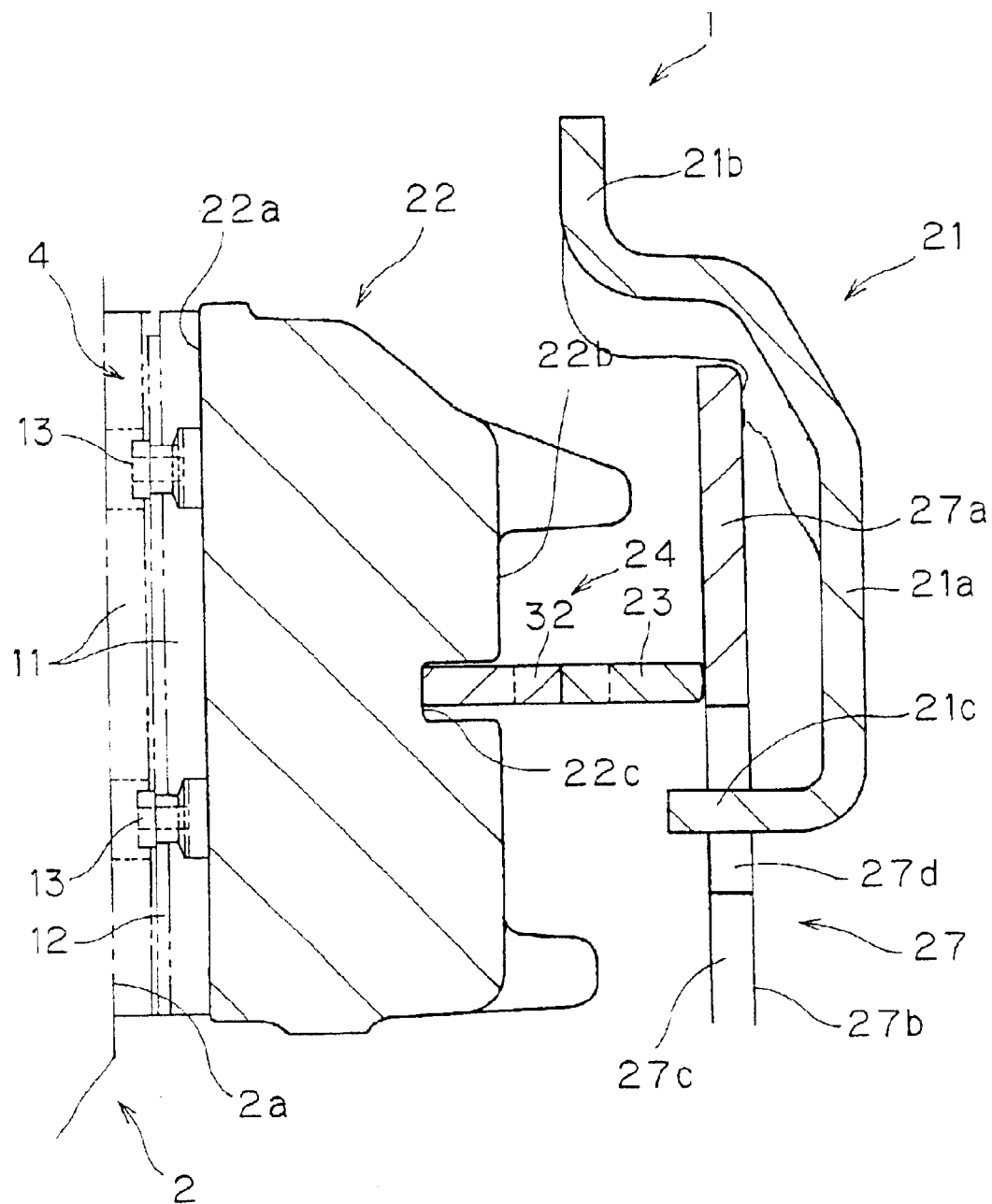
FIG. 3 is a fragmentary schematic cross-sectional view of the clutch cover assembly taken along line I-0 in FIG. 2.

Referring again to FIG. 1, the pressure plate 22 is axially located between the clutch disk 4 and the circular plate portion of the clutch cover 21, and is close to the clutch disk 4. The pressure plate 22 has an annular form, and is preferably made of cast iron or the like. As seen in FIG. 3, the pressure plate 22 has a friction surface 22a opposed to the clutch disk 4 and a second side surface 22b opposed to the clutch cover 21. The pressure plate 22 is provided at a radially middle portion of its second side surface 22b with a narrow annular groove 22c. The biasing mechanism 24, which will be described later in detail, is arranged in this groove 22c. Further, as seen in FIG. 4, the pressure plate 22 is provided at its outer peripheral surface with a plurality of, preferably four, radial projections 22d. As seen in FIG. 10, the projections 22d correspond to axial apertures 21d and 21e.

Figure 9:
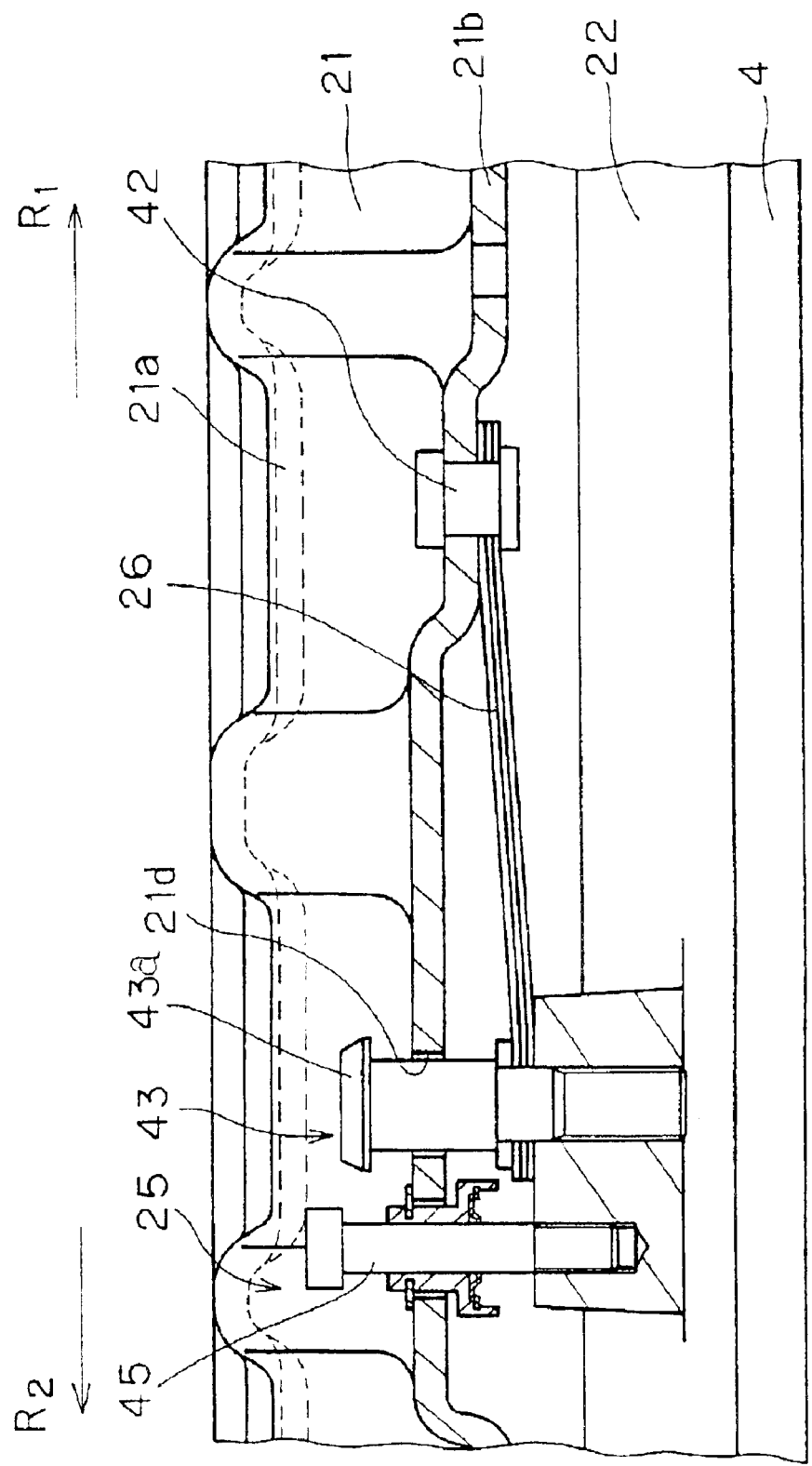
FIG. 9 is a schematic cross-sectional plan view of a restricting mechanism of the clutch cover assembly taken along arc IX—IX in FIG. 16.

The strap plates 26 are provided for coupling the pressure plate 22 to the clutch cover 21. Each strap plate 26 is formed of a plurality of narrow elastic strips, which are overlaid together in the axial direction. As shown in FIG. 9, at a forward end in the rotating direction R1 each strap plate 26 is fixed to an end of the clutch cover 21 by a rivet 42, and is fixed at the other end (i.e., the forward end in the rotating direction R2) to the projection 22d of the pressure plate 22 by a bolt 43. Thereby, the pressure plate 22 is axially movable with respect to the clutch cover 21, but rotates together with the clutch cover 21. In the clutch engaged state, the strap plate 26 biases the pressure plate 22 to move it away from the flywheel 2. As seen in FIG. 10, each bolt 43 is engaged with a first screw hole 22e in the projection 22d, and further extends axially toward the transmission through the first axial aperture 21d in the clutch cover 21. The bolt 43 is provided at its end on the transmission side with a head 43a. The head 43a has a larger diameter than the first axial aperture 21d, and is axially spaced by a predetermined distance from the surface of the clutch cover 21 on the transmission side.

As seen in FIG. 1, the fulcrum ring 23 is configured to receive a load from the diaphragm spring 27, and thereby to move together with the pressure plate 22 toward the flywheel 2. The fulcrum ring 23 is a cylindrical member having a small radial width, and is arranged in the groove 22c formed on the second surface 22b of the pressure plate 22, as seen in FIG. 3. A predetermined distance is maintained between the fulcrum ring 23 and the groove 22c on the pressure plate 22. The fulcrum ring 23 has a flat surface on its transmission side, and is provided at this flat surface preferably with four portions 23b, which are slightly concaved and are circumferentially equally spaced from each other, as shown in FIG. 5.

As seen in FIG. 1, the wear compensating mechanism 29 is provided to move axially the fulcrum ring 23 relative to the pressure plate 22 toward the transmission in accordance with a wear amount of the friction facing 11, and thereby maintaining an intended attitude of the diaphragm spring 27.

The wear compensating mechanism 29 includes the biasing mechanism 24 and the restricting mechanism 25.

Figure 5:
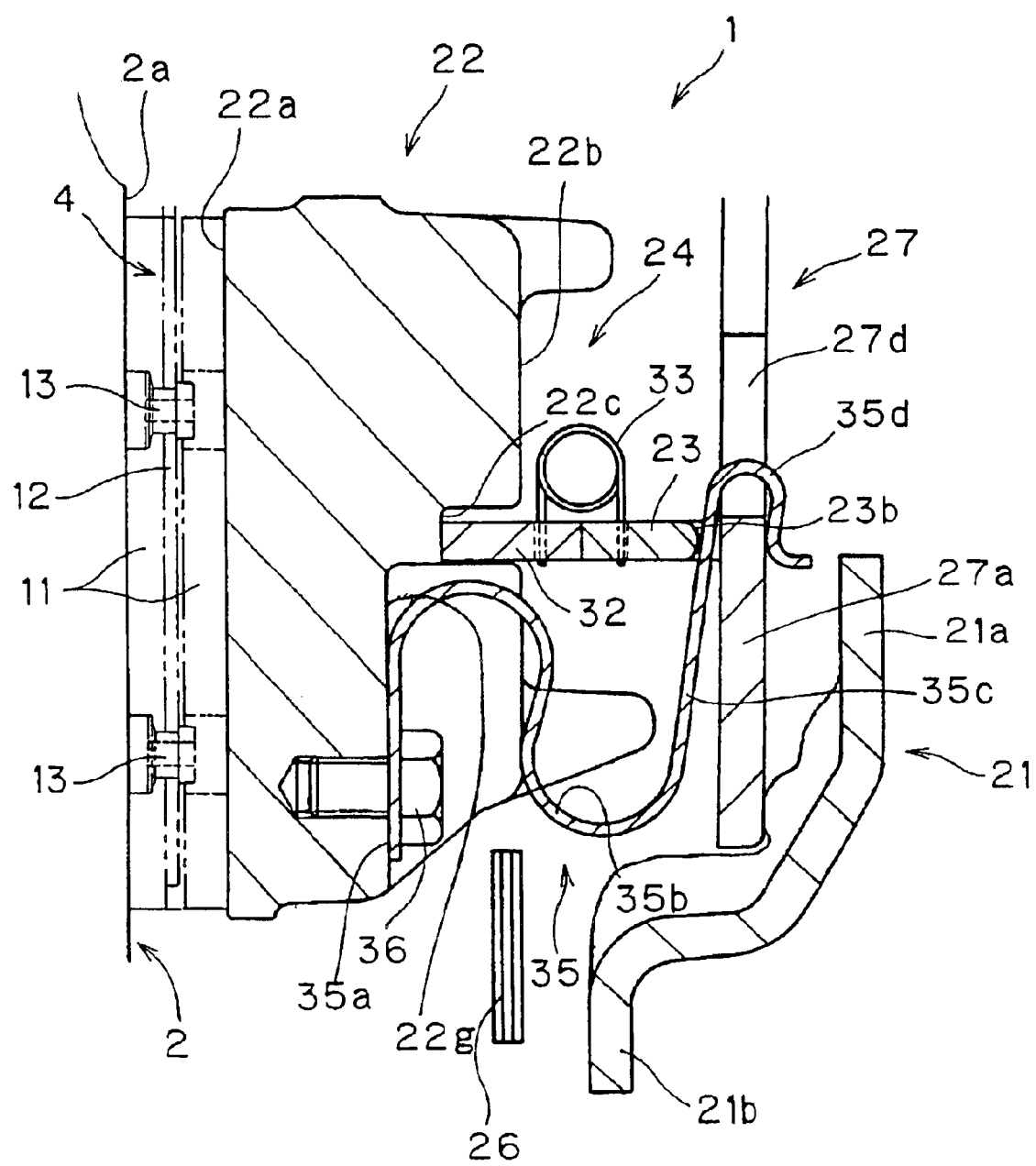
FIG. 5 is a fragmentary schematic cross-sectional view of the clutch cover assembly taken along line V—V in FIG. 16.
Figure 14:
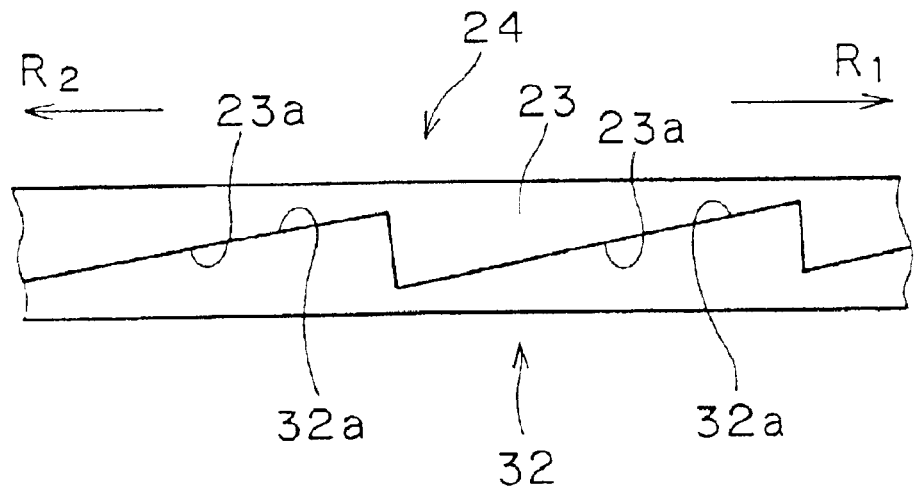
FIG. 14 is a schematic side elevational view of a biasing mechanism of the clutch cover assembly.
Figure 15:
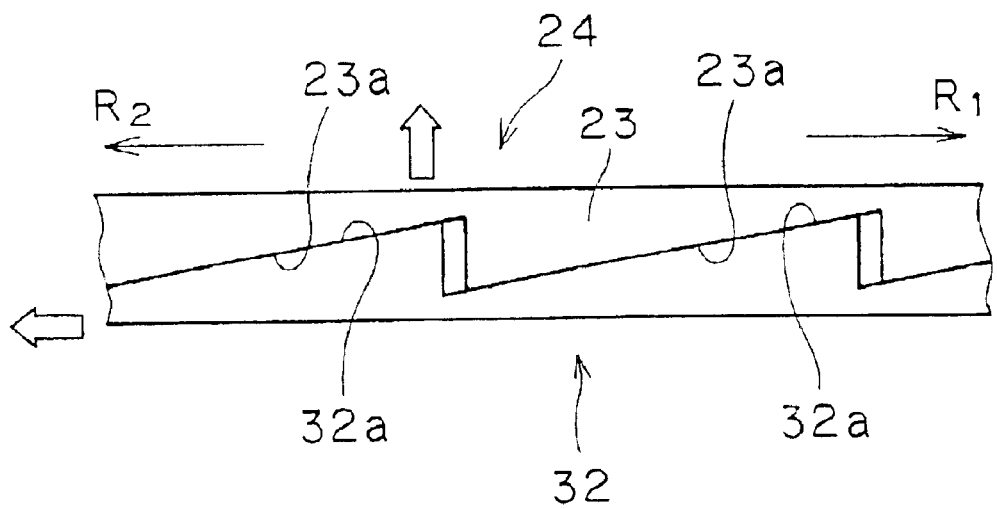
FIG. 15 is a view corresponding to FIG. 14 and illustrating a wear compensating operation.

As seen in FIGS. 3 and 5, the biasing mechanism 24 is arranged between the groove 22c on the pressure plate 22 and the fulcrum ring 23. The biasing mechanism 24 is provided for applying an offset load to the fulcrum ring 23 to move it away from the pressure plate 22 (i.e., axially toward the transmission). The biasing mechanism 24 is primarily formed of the fulcrum ring 23, the rotary plate 32, and a plurality of return springs 33. As seen in FIGS. 14 and 15, the fulcrum ring 23 is provided at its surface on the engine side with a plurality of first inclined surfaces 23a each extending circumferentially a predetermined length. As shown in FIG. 14, the first inclined surface 23a of the fulcrum ring 23 becomes higher (i.e., shifts toward the engine) as the position moves forward in the R2 direction, and the forward end thereof in the R1 direction forms the lowest end. Referring again to FIG. 3, the rotary plate 32 has a cylindrical form, and is circumferentially movable in the groove 22c. The surface of the rotary plate 32 on the engine side is flat, and is in contact with the bottom of the groove 22c. Referring again to FIGS. 14 and 15, the surface of the rotary plate 32 on the transmission side is provided with a plurality of second inclined surfaces 32a, each extending circumferentially a predetermined distance. The second inclined surfaces 32a of the rotary plate 32 are formed and located to be in complementary contact with the first inclined surfaces 23a so that these surfaces 32a and 23a form a wedge mechanism.

As seen in FIG. 5, each return spring 33 is formed of a tension spring, and pulls the rotary plate 32 in the rotating direction R2 relative to the fulcrum ring 23. Consequently, the return springs 33 apply a load to the rotary plate 32 to rotate it in the rotating direction R2. Thus, the fulcrum ring 23 receives a load, preferably an offset load by the biasing mechanism 24 from the rotary plate 32 to move the fulcrum ring 23 axially toward the transmission and with respect to the rotary plate 32. In other words, the load the fulcrum ring 23 receives moves it axially away from the rotary plate 32. In an operation that compensates for clutch wear, which will be described later, the diaphragm spring 27 initially and relatively moves away from the fulcrum ring 23 because of friction facing 11 wear. In accordance with such movement, as shown in FIG. 15, the rotary plate 32 moves in the rotating direction R2 with respect to the pressure plate 22 and the fulcrum ring 23, and the fulcrum ring 23 moves axially toward the transmission with respect to the pressure plate 22 and the rotary plate 32.

As seen in FIG. 10, the restricting mechanism 25 inhibits the axial movement of the fulcrum ring 23 when the friction facings 11 are not worn. When the friction facings 11 are worn, the restricting mechanism 25 detects the amount of such wear, and allows the axial movement of the fulcrum ring by a distance corresponding to the wear amount. More specifically, the restricting mechanism 25 restricts an extent of the disengagement of the pressure plate 22, and restricts the movement of the pressure plate 22 away from the friction facing of the clutch disk 4 in the clutch release operation. The restricting mechanism 25 is arranged in the projections 22d of the pressure plate 22. The restricting mechanism 25 is formed of bolts 45 and bushings 46. Each bolt 45 is engaged with a second screw hole 22f in the projection 22d. The bolt 45 extends axially toward the transmission through the second axial aperture 21e in the radially outer portion 21b of the clutch cover 21. The bushing 46 has a cylindrical form, and is frictionally engaged with an outer peripheral surface of a shank of the bolt 45. The bushing 46 is axially movably engaged with the second axial aperture 21e in the clutch cover 21 for axial movement by a predetermined distance. A snap ring 47 is fixed to an end of the bushing 46 on the transmission side. The snap ring 47 has an outer diameter larger than the diameter of the second axial aperture 21e, and is in axial contact with the surface of the clutch cover 21 on the transmission side. The bushing 46 is provided at its end on the engine side with a flange 48 extending radially outward. The flange 48 is formed of a circular plate portion 48a and a cylindrical portion 48b extending axially toward the engine from the outer periphery of the portion 48a. A predetermined axial space is maintained between the flange 48 and the surface of the clutch cover 21 on the engine side. The axial length of this space is equal to a distance, by which the pressure plate 22 can move from the position in the clutch engaged state and the position in the clutch released state with respect to the clutch cover 21. A conical spring 49 is arranged on an end surface of the flange 48 on the engine side. An outer periphery of the conical spring 49 is fixed to the circular plate portion 48a by a snap ring 50, which is fixed to an inner peripheral surface of the cylindrical portion 48b. An inner periphery of the conical spring 49 is axially spaced from the circular plate portion 48a, and is in contact with the shank of the bolt 45. When the bolt 45 tends to move axially toward the engine with respect to the bushing 46 (i.e., when wear occurs on the friction facings 11 in the clutch engaged state), the bushing 46 applies a slide load to the bolt 45. When the bolt 45 tends to move axially toward the transmission with respect to the bushing 46 (after the bushing 46 has come into contact with the clutch cover 21), the bushing 46 applies a slide load to the bolt 45, and the inner periphery of the conical spring 49 is engaged into the surface of the bolt 45 creating a lock load. Therefore, the lock load acting on the bolt 45 in the latter case is much larger than the slide load in the former case. As can be seen from the above, the bolt 45 and the bushing 46 form a one-way lock mechanism, in which the conical spring 49 changes a resistance acting from the clutch cover 21 to the pressure plate 22 depending on the direction of the axial movement. Thus, the pressure plate 22 preferably can be adjusted only in a direction away for the clutch cover 21. A head 45a formed at an end of the bolt 45 is axially spaced from a surface of the bushing on the transmission side by a predetermined distance.

As seen in FIG. 1, the diaphragm spring 27 is supported by the clutch cover 21, and pushes the pressure plate 22 toward the flywheel 2 via the fulcrum ring 23. The diaphragm spring 27 has a substantially circular disk-like form. As seen in FIG. 2, the diaphragm spring 27 has an elastic portion 27a at its radially outer portion, and a plurality of lever portions 27b. The lever portions 27b extend radially inward from the elastic portion 27a. Thus, the diaphragm spring 27 has a large central aperture, and a plurality of slits 27c extending radially outward from the central aperture. A substantially rectangular aperture 27d, which has round corners and is circumferentially wider than the slit 27c, is preferably formed at a radially outer end of each slit 27c, i.e., between base ends of the lever portions 27b. The outer peripheral portion of the diaphragm spring 27 is supported by the clutch cover 21. More specifically, as seen in FIG. 4, a support portion 21f of the clutch cover 21 axially supports the surface of the outer peripheral portion of the elastic portion 27a on the transmission side. The surface of the inner peripheral portion of the elastic portion 27a on the engine side is axially supported by the surface of the fulcrum ring 23 on the transmission side. In this manner, the diaphragm spring 27 is supported by the clutch cover 21, and applies a set load axially directed toward the engine to the fulcrum ring 23 and the pressure plate 22. As seen in FIG. 3, through the rectangular apertures 27d in the diaphragm spring 27, a plurality of engagement projections 21c axially extend toward the engine from the inner periphery of the clutch cover 21, respectively. By this engagement, the diaphragm spring 27 rotates together with the clutch cover 21.

As seen in FIG. 1, the release device 28 is configured to release the clutch by releasing the pushing force of the diaphragm spring 27 from the pressure plate 22. The release device 28 is formed of a release bearing 53 and other members. The release bearing 53 is formed of inner and outer races as well as a plurality of rolling members disposed therebetween.

Figure 11:
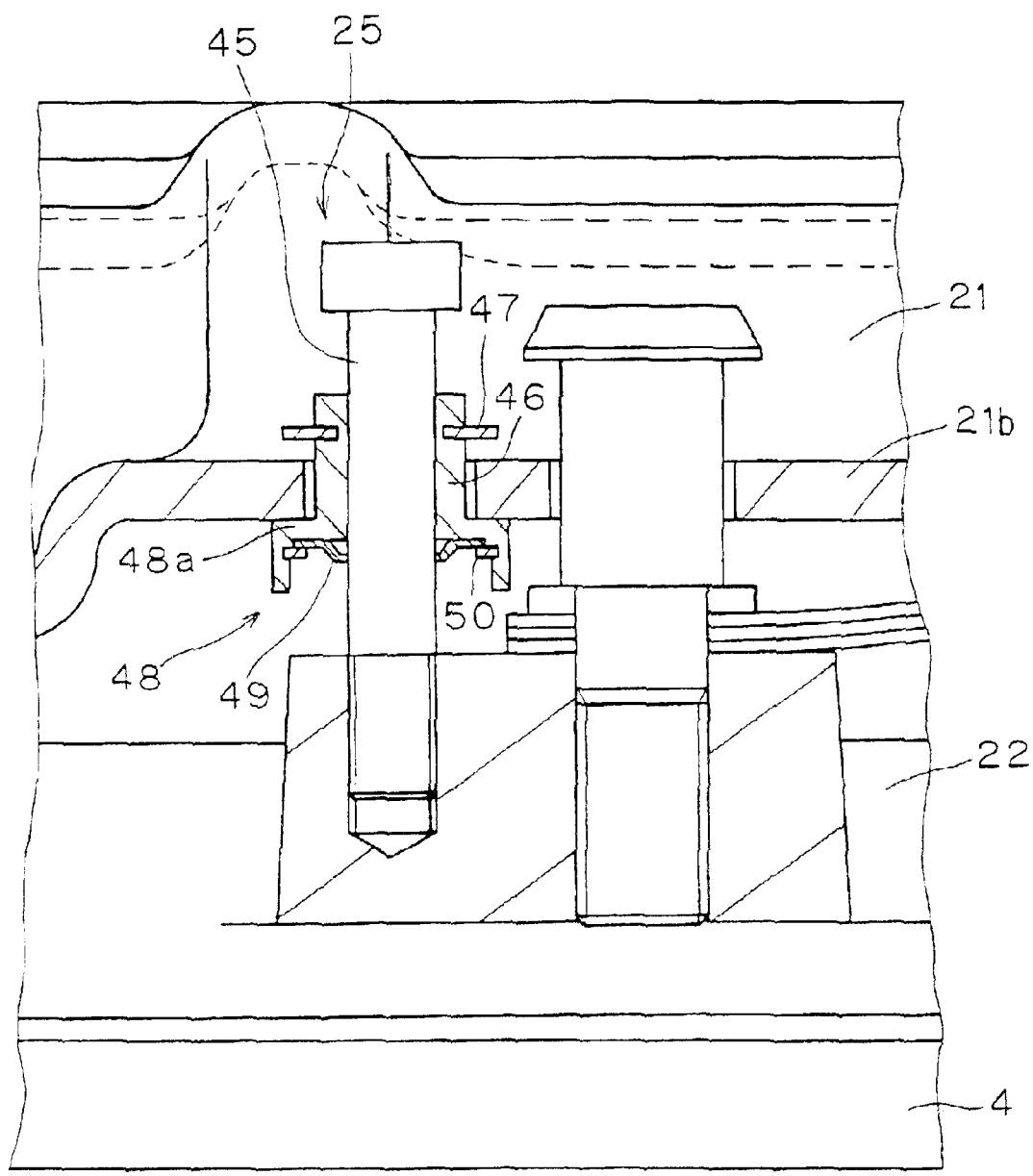
FIG. 11 is a view corresponding to FIG. 10 and illustrating a clutch release operation.

The diaphragm spring 27 can change its attitude between that in the clutch engaged state depicted by solid line in FIG. 1 and that in the clutch released state, which is depicted by alternate long and two short dashes line. The change in the diaphragm spring 27a attitude is attained by pulling the end of each lever portion 27b axially toward the transmission by the release bearing 53. The state in which the release bearing 53 is located at the axial end position on the transmission side is referred to as a maximum release state. In this state, the end of the diaphragm spring 27 is located at a maximum stroke point (i.e., a point spaced by a predetermined distance from the friction surface of the flywheel 2, or a point spaced by a predetermined distance from the transmission wall). At the instant when the maximum release state is attained, the bushing 46 of the restricting mechanism 25 comes into contact with the clutch cover 21 to stop the movement of the pressure plate 22, as shown in FIG. 11. In the maximum release state, therefore, the surface of the fulcrum ring 23 on the transmission side is in contact with the diaphragm spring 27.

Figure 16:
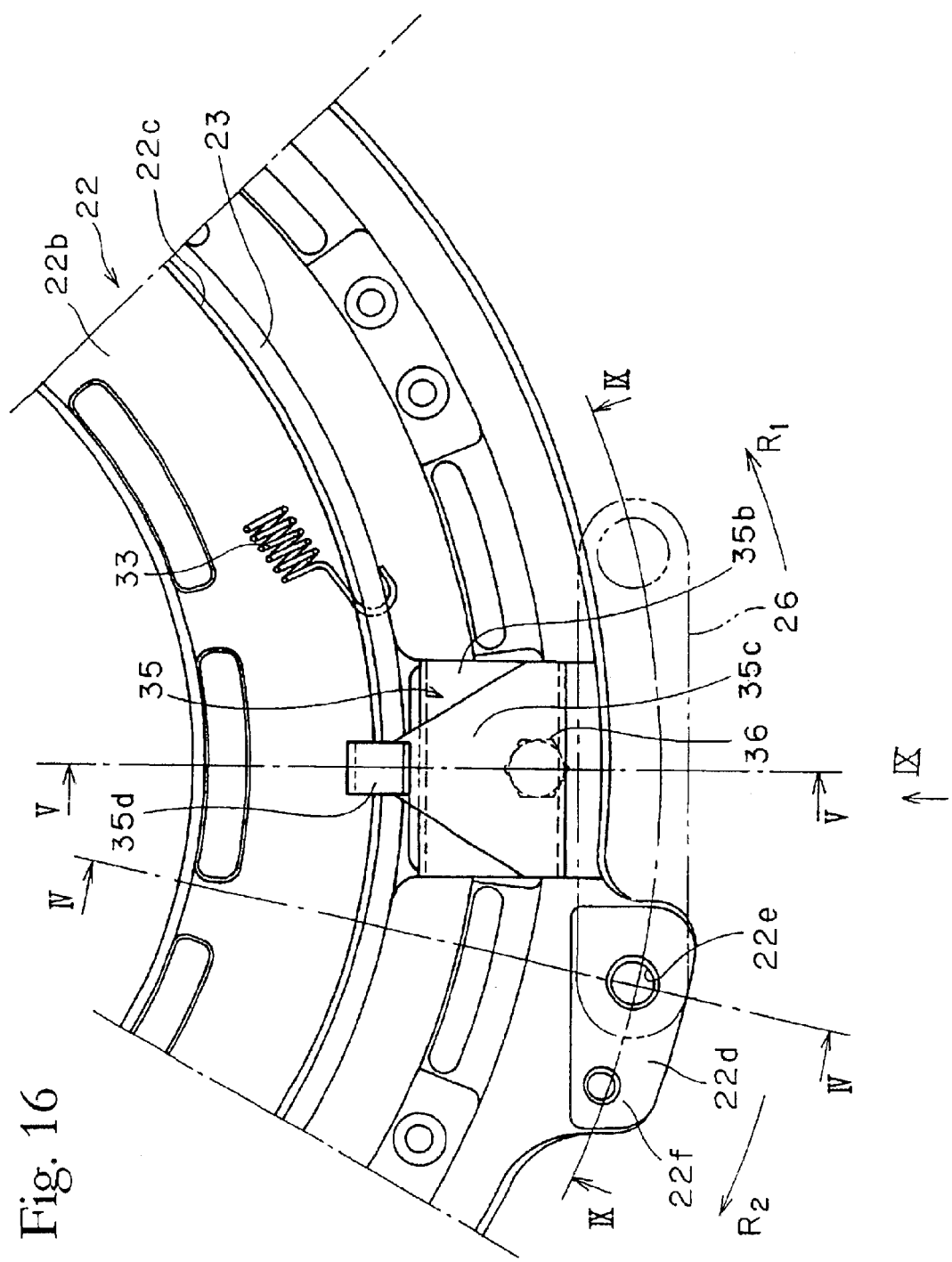
FIG. 16 is a fragmentary elevational view of the clutch cover assembly and corresponds to a fragmentary enlarged view of the structure in FIG. 2.

Referring now to FIG. 5, a leaf spring 35 formed of a thin plate-like elastic member is provided for biasing the pressure plate 22 and the fulcrum ring 23 axially toward each other. The leaf spring 35 is arranged in each of the concave portions 22g of the pressure plate 22. Thus, the four leaf springs 35 are arranged on the pressure plate 22, and are circumferentially equally spaced from each other. As seen in FIGS. 5 and 16, each concave portion 22g is located near the forward side in the rotating direction R1 of the projection 22d, and its outer periphery continues to the groove 22c. Each concave portion 22g has a circumferentially uniform width, and has a flat bottom surface parallel to the friction surface 22a. As shown in FIG. 5, the leaf spring 35 has a flat fixed portion 35a, a first curved portion 35b, a straight portion 35c, and a second curved portion 35d. The first curved portion 35b has an S-shaped (inverted S-shaped, in FIG. 5) section and extends substantially axially from a radially inner end of the fixed portion 35a toward the transmission. The straight portion 35c extends radially inward from the end of the first curved portion 35b. The second curved portion 35d has a curved section extending axially from the end of the straight portion 35c toward the transmission and then is curved radially outward. Each fixed portion 35a of the leaf spring 35 is fixed to the concave portion 22g on the second surface 22b of the pressure plate 22 by a bolt 36. Each of the fixed portion 35a and the first curved portion 35b has circumferentially opposite side edges extending parallel to each other between the radially inner and outer ends. However, as shown in FIG. 16, the straight portion 35c has opposite edges converging radially inward. Thus, the straight portion 35c has a circumferential width, which decreases as the position moves radially inward. As seen in FIG. 5, the end of the straight portion 35c extends through the concave portion 23b, which is formed at the edge of the fulcrum ring 23 on the transmission side, to a position radially inside the fulcrum ring 23. The second curved portion 35d extends through the rectangular aperture 27d in the diaphragm spring 27 toward the transmission, and has an end, which is in contact with the surface, on the transmission side, of the inner peripheral portion of the elastic portion 27a of the diaphragm spring 27 (i.e., the surface opposite to the surface of the elastic member 27a pushing the fulcrum ring 23). In this state, the leaf spring 35 applies a "preload" to the pressure plate 22 and the fulcrum ring 23 to move these members axially toward each other. In particular, the leaf spring 35 biases the fulcrum ring 23 through the diaphragm spring 27. The fulcrum ring 23 rotates together with the pressure plate 22 owing to the engagement of the leaf spring 35 with the concave portion 23b.

(2) Operation

Clutch Engagement

In the clutch engaged state, the diaphragm spring 27 biases the fulcrum ring 23 toward the engine side. Thereby, the clutch disk 4 of the clutch disk assembly 3 is held between the pressure plate 22 and the flywheel 2 as shown in FIGS. 5 and 10.

Clutch Release

Figure 6:
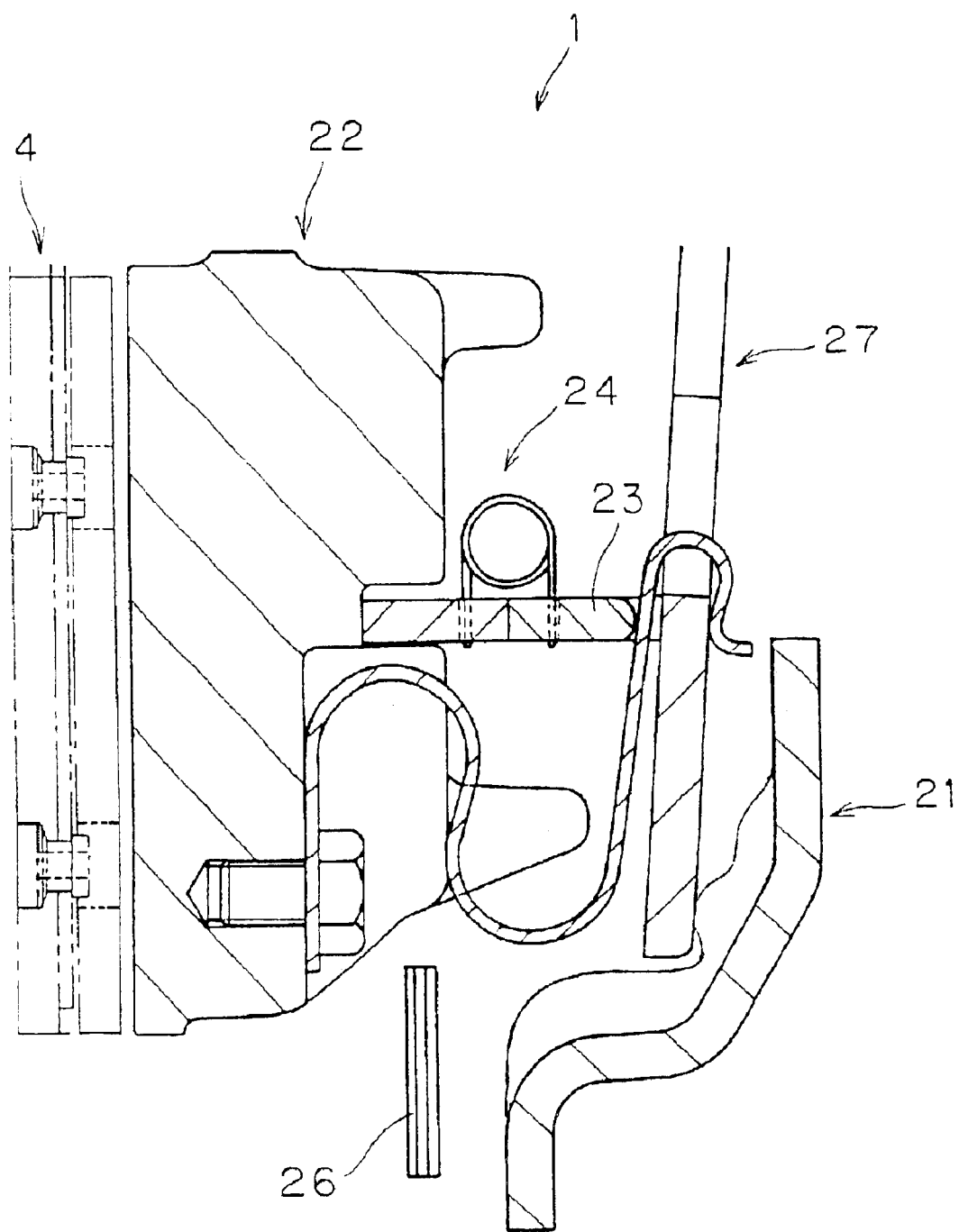
FIG. 6 is a view corresponding to FIG. 5 and illustrating a clutch release operation of the clutch cover assembly.

As seen in FIGS. 1 and 5, in the clutch release operation, the release device 28 moves axially toward the transmission. Thereby, the end of the lever portion 27b of the diaphragm spring 27 is axially pulled by the release device 28 toward the transmission so that the fulcrum ring 23 is released from the pushing force applied by the elastic portion 27a. By a restoring force of the strap plates 26, as shown in FIG. 6, the pressure plate 22 and the fulcrum ring 23 are moved axially toward the transmission. Thereby, the pressure plate 22 no longer applies the pressing force to the clutch disk 4 of the clutch disk assembly 3. When the diaphragm spring 27 changes its attitude and attains the maximum release state, the flange 48 of the bushing 46 of the restricting mechanism 25 comes into contact with the clutch cover 21 as shown in FIG. 1 so that the pressure plate 22 no longer moves axially.

Occurrence of Wear

Figure 7:
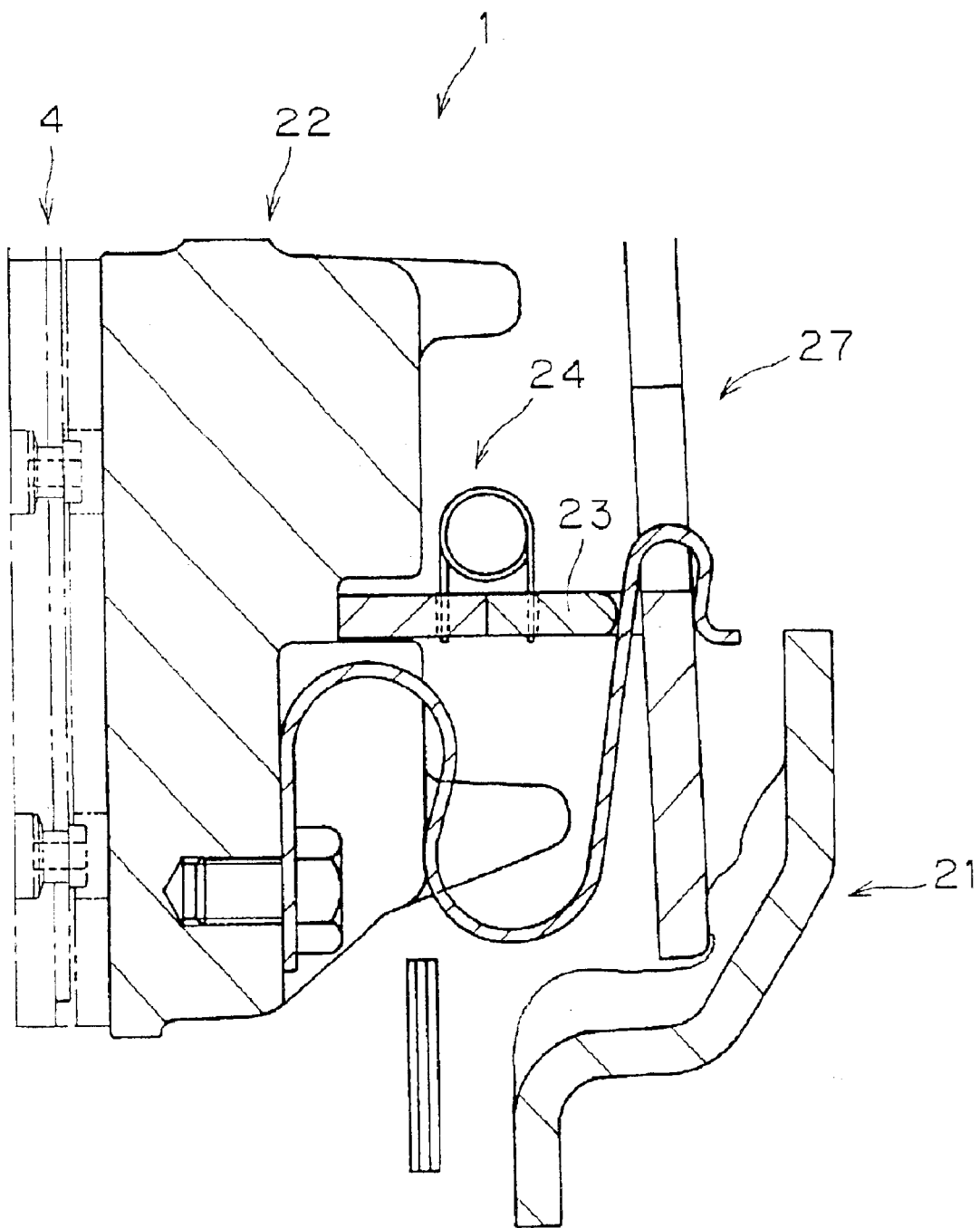
FIG. 7 is a view corresponding to FIG. 5 and illustrating a state in which wear of a friction facing of the clutch cover assembly occurs in a clutch engaged state.
Figure 8:
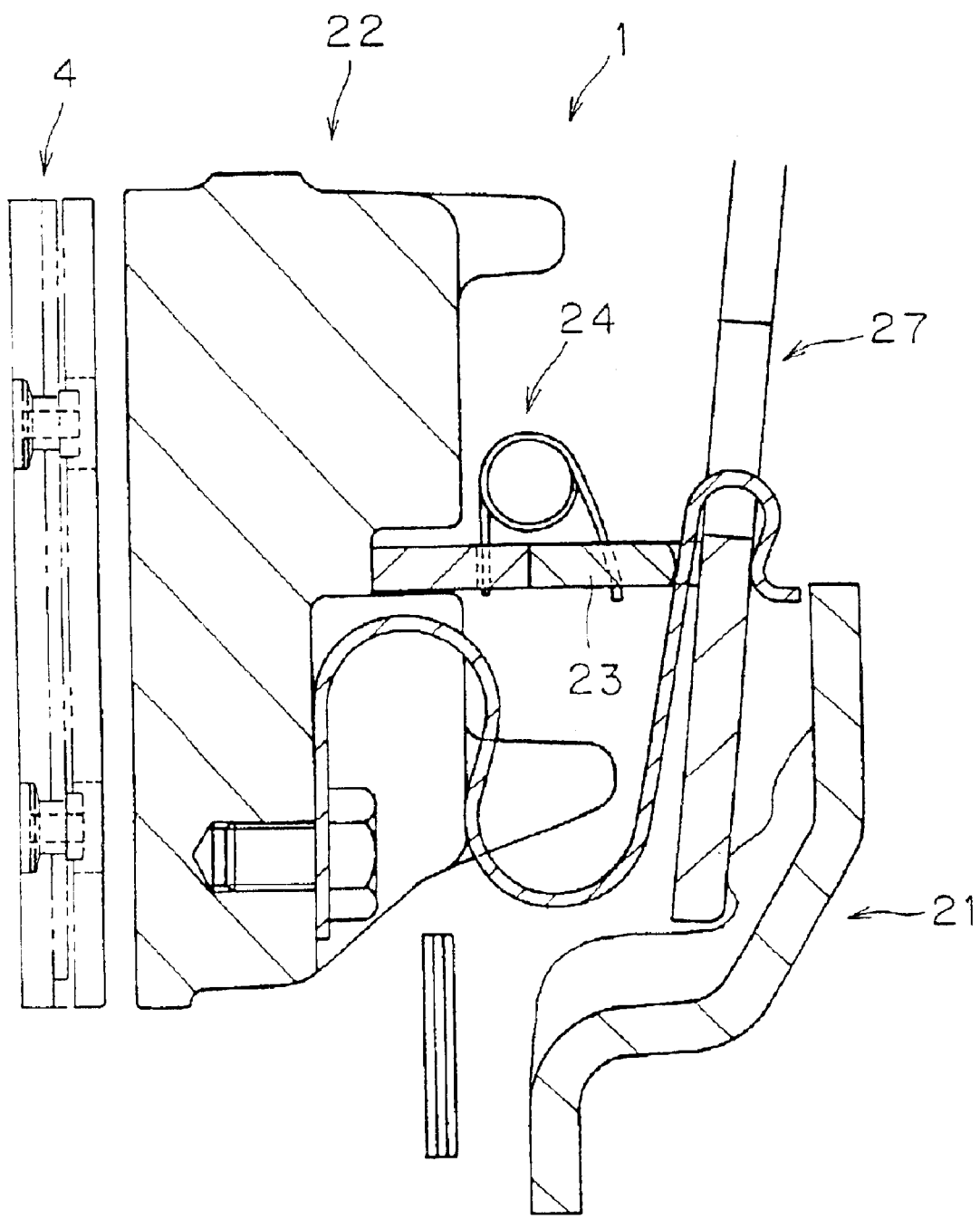
FIG. 8 is a view corresponding to FIG. 5 and illustrating a clutch release operation after occurrence of the wear.
Figure 12:
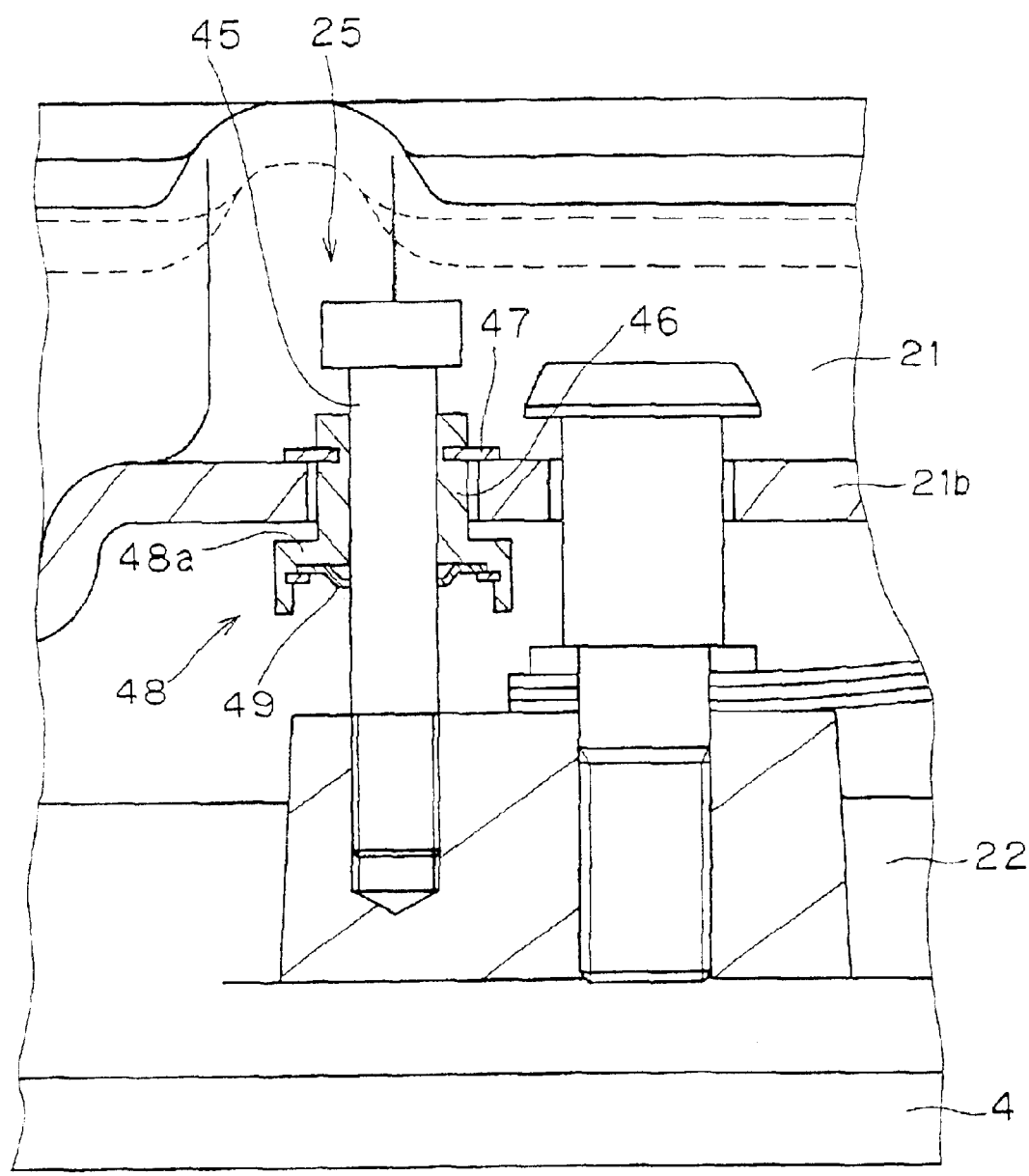
FIG. 12 is a view corresponding to FIG. 10 and illustrating a state in which wear occurs in a clutch engaged state.
Figure 13:
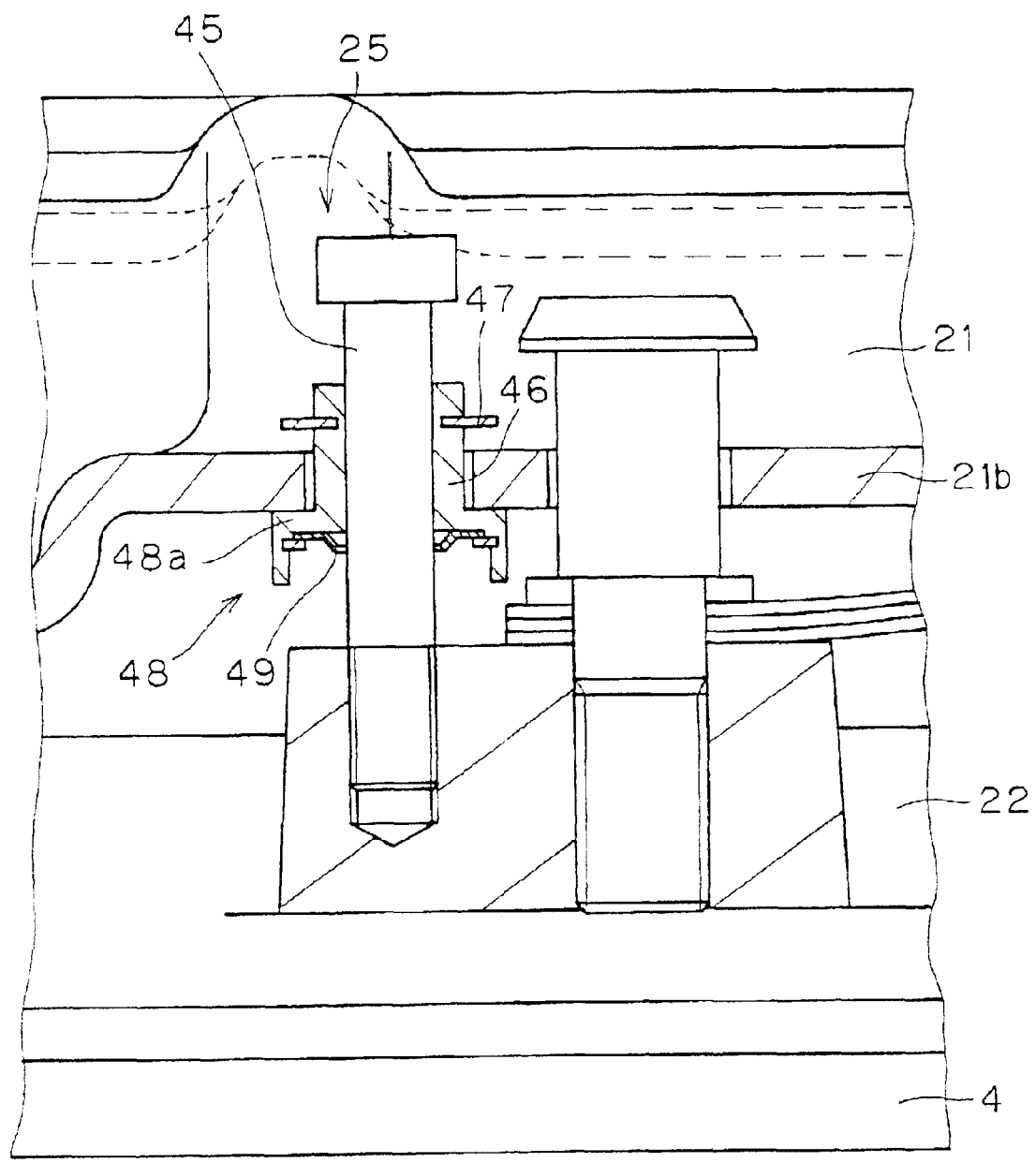
FIG. 13 is a view corresponding to FIG. 10 and illustrating a clutch release operation after the occurrence of wear.

As shown in FIGS. 7 and 12, when the friction facings 11 are worn in the clutch engaging operation, the pressure plate 22 and the fulcrum ring 23 move a distance corresponding to the amount of wear toward the flywheel 2. In this operation, the bolt 45 of the restricting mechanism 25 axially moves together with the pressure plate 22 toward the engine. However, the bushing 46 cannot move axially because the snap ring 47 is in contact with the clutch cover 21. Therefore, the bolt 45 moves axially and slides with respect to the bushing 46.

When the clutch release operation is performed, the restoring force of the strap plates 26 axially moves the pressure plate 22 and the fulcrum ring 23 toward the transmission. When the flange 48 of the bushing 46 comes into contact with the clutch cover 21, axial movement of the pressure plate 22 is stopped by the flange 48. In this operation, the pressure plate 22 axially moves a distance, which is equal to that before the wearing, with respect to the clutch cover 21. However, the axial position, where the pressure plate 22 stops with respect to the clutch cover 21, is axially shifted toward the engine by a distance corresponding to the amount of wear. Thereby, the clutch does not attain the maximum release state when the pressure plate 22 stops its axial movement, and thereafter the release device 28 further changes the attitude of the diaphragm spring 27.

Referring to FIG. 5, in this operation, the diaphragm spring 27 axially pulls the end of the leaf spring 35 toward the transmission so that the clipping load of the leaf spring 35 is released from the fulcrum ring 23. Consequently, the offset load of the biasing mechanism 24 moves and separates the fulcrum ring 23 from the pressure plate 22. In this operation, the surface of the fulcrum ring 23 on the transmission side is kept in contact with the diaphragm spring 27, and no space occurs between them. When the end of the diaphragm spring 27 moves to the maximum stroke position (in the maximum release state), the fulcrum ring 23 stops its separating operation.

When the clutch engaging operation starts, the fulcrum ring 23 has already returned to the same axial position as that before the wearing relative to the diaphragm spring 27. Therefore, the pushing attitude and pushing load of the diaphragm spring 27 do not change. As described above, the diaphragm spring 27 restricts the axial movement of the fulcrum ring 23. Therefore, the adjustment for the wear is performed not only for the wear of the friction facings 11 but also for the wear of various support and fulcrum portions. Consequently, even when the wear occurs on various support and/or fulcrum portions, the diaphragm spring 27 keeps a uniform attitude and position. Even when the clutch cover assembly 1 receives axial vibrations in the clutch released state, separation of the pressure plate 22 from the fulcrum ring 23 is suppressed because the leaf spring 35 axially biases the pressure plate 22 and the fulcrum ring 23 toward each other. Therefore, over-adjustment relative to the amount of wear is suppressed.

(3) Relationship Between Axial Loads

The loads acting axially on various portions of the clutch cover assembly 1 will now be described in detail. In the following description, the specific numerical values are used merely for illustrating relationships between the loads, and the invention is not restricted to such values.

Referring to FIGS. 5 and 10, the diaphragm spring 27 provides a set load of 30000 N, which is maintained in both the initial state and the fully worn state. The offset load (in the maximum release state) of the strap plates 26 is equal to 500 N (=125 N×4) in the initial state, and is equal to 1500 N (375 N×4) in the fully worn state. The clipping load, which is applied by the leaf springs 35 independently of the release amount, is equal to 1800 N (=450 N×4) in the initial state, and is equal to 4400 N (=1100N×4) in the fully worn state. The offset load applied by the biasing mechanism 24 is equal to 500 N in the initial state, and is equal to 250 N in the fully worn state.

In the restricting mechanism 25, the slide load is applied from the bushing 46 to the bolt 45 when the bolt 45 axially moves relatively to the bushing 46 toward the engine due to wearing during the clutch engaging operation. Since this slide load causes a loss of the set load, it is preferable that the set load is as small as possible. However, the set load must have a certain magnitude for preventing easy shifting due to vibrations, and therefore is equal to 250 N per position.

In the restricting mechanism 25, when the lock load acts on the bolt 45 after the bushing 46 comes into contact with the clutch cover 21 during the clutch releasing, this lock load is equal to or larger than 2000 N per position, and thus is relatively very large because the conical spring 49 is engaged into the shank of the bolt 45. However, the maximum load applied to each one-way lock in the maximum release state is equal to 1475 N (=1100 N+375 N), i.e., a sum of the clipping load of 1100 N by the leaf spring 35 and the offset load of 375 N by the strap plate 26. Since the lock load is much larger than the maximum load applied to the one-way lock, the one-way lock functions correctly in spite of the fact that the maximum load acting on the one-way lock is larger than that in a conventional structure.

The load for preventing the separation of the pressure plate 22 and the fulcrum ring 23 is equal to 2300 N, which is equal to (450 N×4+125×4), i.e., a sum of the clipping loads by the leaf springs 35 and the offset loads by the strap plates 26. The offset load of 500 N applied by the biasing mechanism 24 acts in the direction promoting the separation of the pressure plate 22 and the fulcrum ring 23. Consequently, the load required for preventing the separation of the pressure plate 22 and the fulcrum ring 23 is equal to 1800 N (=2300 N−500 N). Assuming that the pressure plate 22 has a mass of 22.5 kg, the maximum acceleration, which does not cause the separation when it acts on the pressure plate 22, is equal to (1800 N)/(22.5 kg×9.81)=8.2 G according to the above relationships. As described above, the clipping load newly produced by the leaf spring 35 can suppress separation of the pressure plate 22 and the fulcrum ring 23 in the clutch release operation.

From the viewpoint of preventing the separation of the pressure plate 22 and the fulcrum ring 23, it is preferable that the clipping load of the leaf spring 35 is as large as possible. However, the clipping load must be restricted in view of the load resistance or durability of the one-way lock and the clipping stress. Further, the clipping load unpreferably increases the release load. More specifically, the release load is increased by 1014 N equal to (1100 N (clipping load of leaf spring 35)×4)/4.34, assuming that the clutch leverage is equal to 4.34. However, the amount of increased release load is hardly felt immediately after the adjustment for wearing.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

2. Second Embodiment

Figure 17:
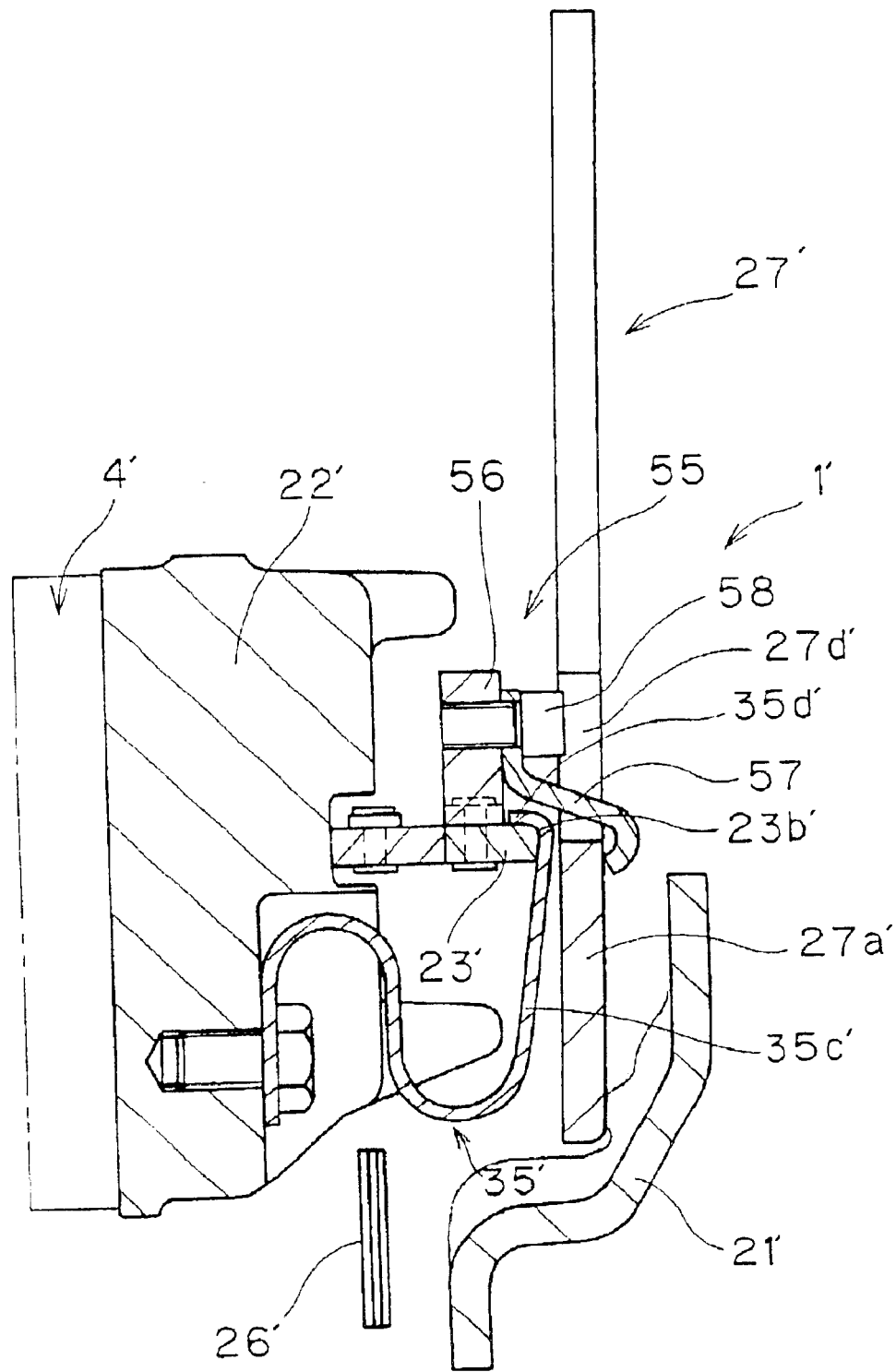
FIG. 17 is a partial schematic cross-sectional view of a clutch cover assembly in accordance with a second preferred embodiment of the present invention taken along line XVII—XVII in FIG. 18.
Figure 18:
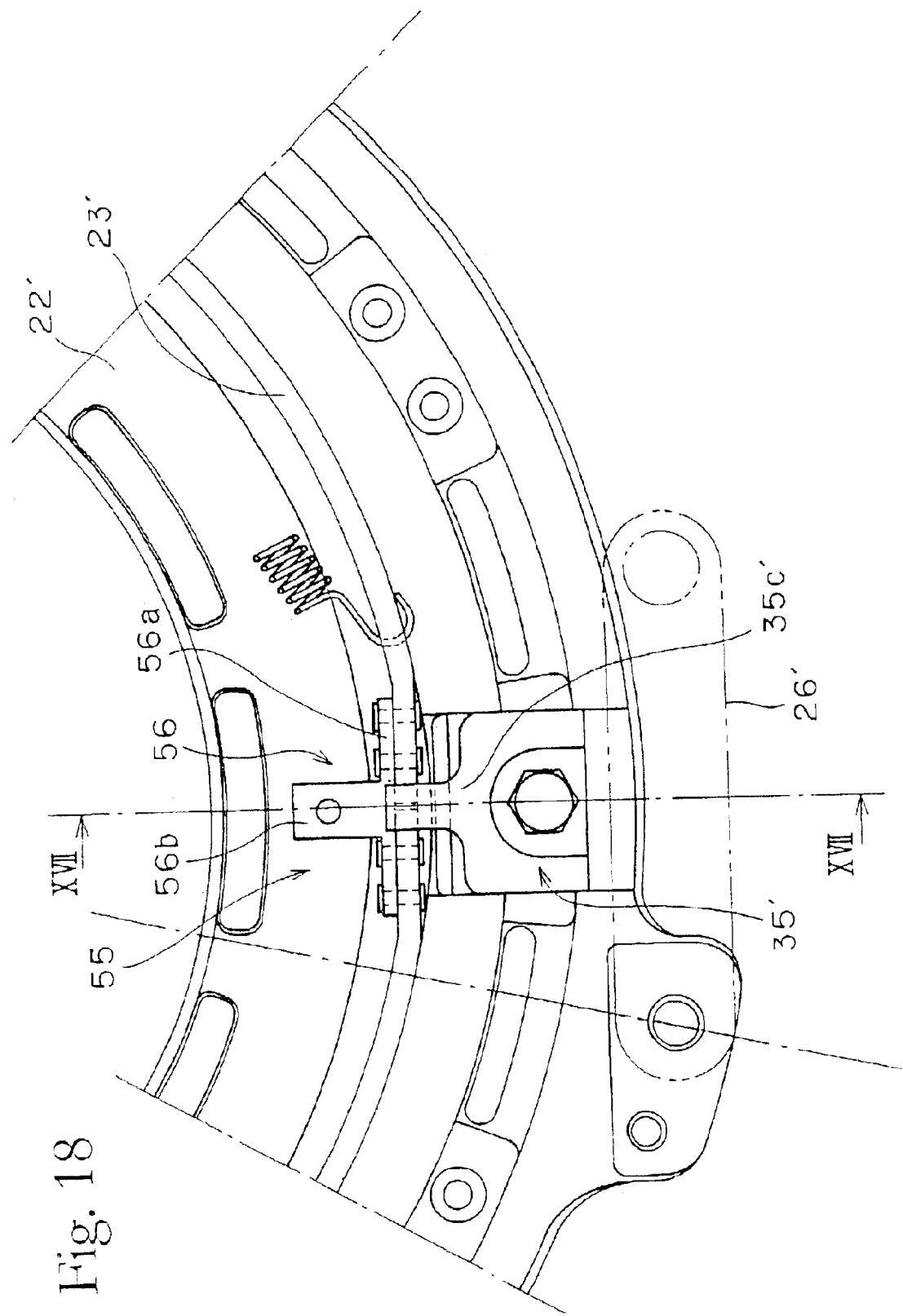
FIG. 18 is a fragmentary elevational view of the clutch cover assembly of FIG. 17.
Figure 19:
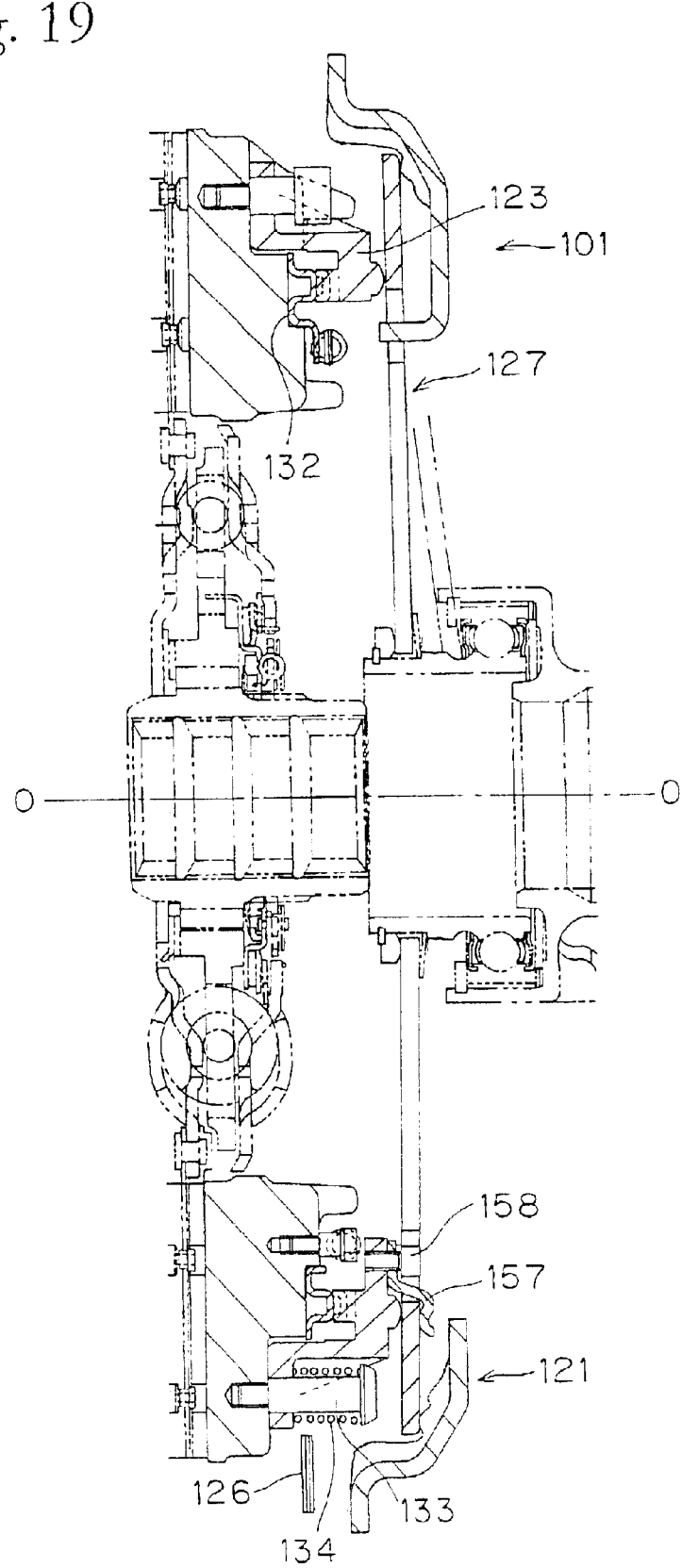
FIG. 19 is a schematic cross-sectional view of a clutch cover assembly in accordance with a third preferred embodiment of the invention taken along angle IXX-0-IXX' in FIG. 20.

FIGS. 17 and 18 show a clutch cover assembly 1' in accordance with a second preferred embodiment of the present invention. Since the clutch cover assembly 1' has basically the same structure as that of the first embodiment, only differences will be described below.

As shown in FIG. 18, a straight portion 35c' of a leaf spring 35' has a uniform circumferential width in contrast to the first embodiment, but is provided at its end with a projected portion having a small circumferential width. This projected portion is fitted into a concave portion 23b' formed on an edge of a fulcrum ring 23' on the transmission side, and is in contact with the surface forming the edge. In this state, the leaf spring 35' biases the fulcrum ring 23' toward the pressure plate 22'. The straight portion 35c' is provided at its end with a bent portion 35d' in contact with the radially inner surface of the fulcrum ring 23'.

The clutch cover assembly 1' further includes engagement portions 55. Each engagement portion 55 is configured such that the fulcrum ring 23' is engaged with a diaphragm spring 27'. Thereby the diaphragm spring 27' forcedly separates the fulcrum ring 23' from the pressure plate 22' in the wear compensating operation. The engagement portions 55 are arranged at a plurality of, preferably four, circumferentially spaced positions on the fulcrum ring 23'. More specifically, the engagement portion 55 is formed of a fixed block 56, a clip 57, and a bolt 58. The fixed block 56 is formed of a fixed portion 56a and a projection 56b. The fixed portion 56a is in contact with the inner peripheral surface of the fulcrum ring 23' and is fixed thereto by rivets. The projection 56b extends radially inward from a circumferentially middle portion of the fixed portion 56a. The clip 57 is formed of a small strip, and has an end fixed to the projection 56b by the bolt 58. The other end of the clip 57 is in contact with the surface of the diaphragm spring 27' on the transmission side. More specifically, the clip 57 extends axially through a substantially rectangular aperture 27d' in the diaphragm spring 27', and the end thereof is in contact with the surface, on the transmission side, of the inner peripheral portion (i.e., portion biasing the fulcrum ring 23') of an elastic portion 27a' of the diaphragm spring 27'.

When a friction facing of a clutch disk 4' is worn in the clutch engaging operation, the pressure plate 22' and the fulcrum ring 23' move a distance corresponding to the wear amount toward a flywheel 2'. When the clutch release operation is then performed, elastic forces of strap plates 26' axially move both the pressure plate 22' and the fulcrum ring 23' toward the transmission. In this operation, a clutch cover 21' axially moves a distance, which is equal to that before the wearing, with respect to the clutch cover 21'. However, the axial position, where the pressure plate 22' stops, with respect to the clutch cover 21' is axially shifted toward the engine by a distance corresponding to the wear amount. At this point in time when the pressure plate 22' stops its axially movement, the clutch is not in the maximum release state, and the attitude of the diaphragm spring 27' is further changed by the release device. In this operation, the diaphragm spring 27' forcedly separates the fulcrum ring 23' from the pressure plate 22' via the engagement portions 55. In this operation, the fulcrum ring 23' is kept in the state where the surface on the transmission side is in contact with the diaphragm spring 27', and a space is not formed between them. When the end of the diaphragm spring 27' reaches the maximum stroke point (maximum release state), the fulcrum ring 23' stops its separation movement.

In this embodiment, the advantage achieved by the provision of the leaf springs 35' is the same as that in the first embodiment. However, although first embodiment provides a simple structure, the first embodiment is more difficult to assemble relative to the second embodiment. In the second embodiment, it is merely required to fix the clips 57 by the bolts 58 in the final state of the assembly, and the assembling operation can be simple. According to the second embodiment, if the fulcrum ring 23' is formed of divided portions, the fixed block 56 can have a function of coupling the divided portions together.

3. Third Embodiment

FIGS. 19 to 23 show a clutch cover assembly 101 in accordance with a third preferred embodiment of the present invention. The third embodiment has basically the same structure as the first embodiment, and only differences will be described below.

Figure 21:
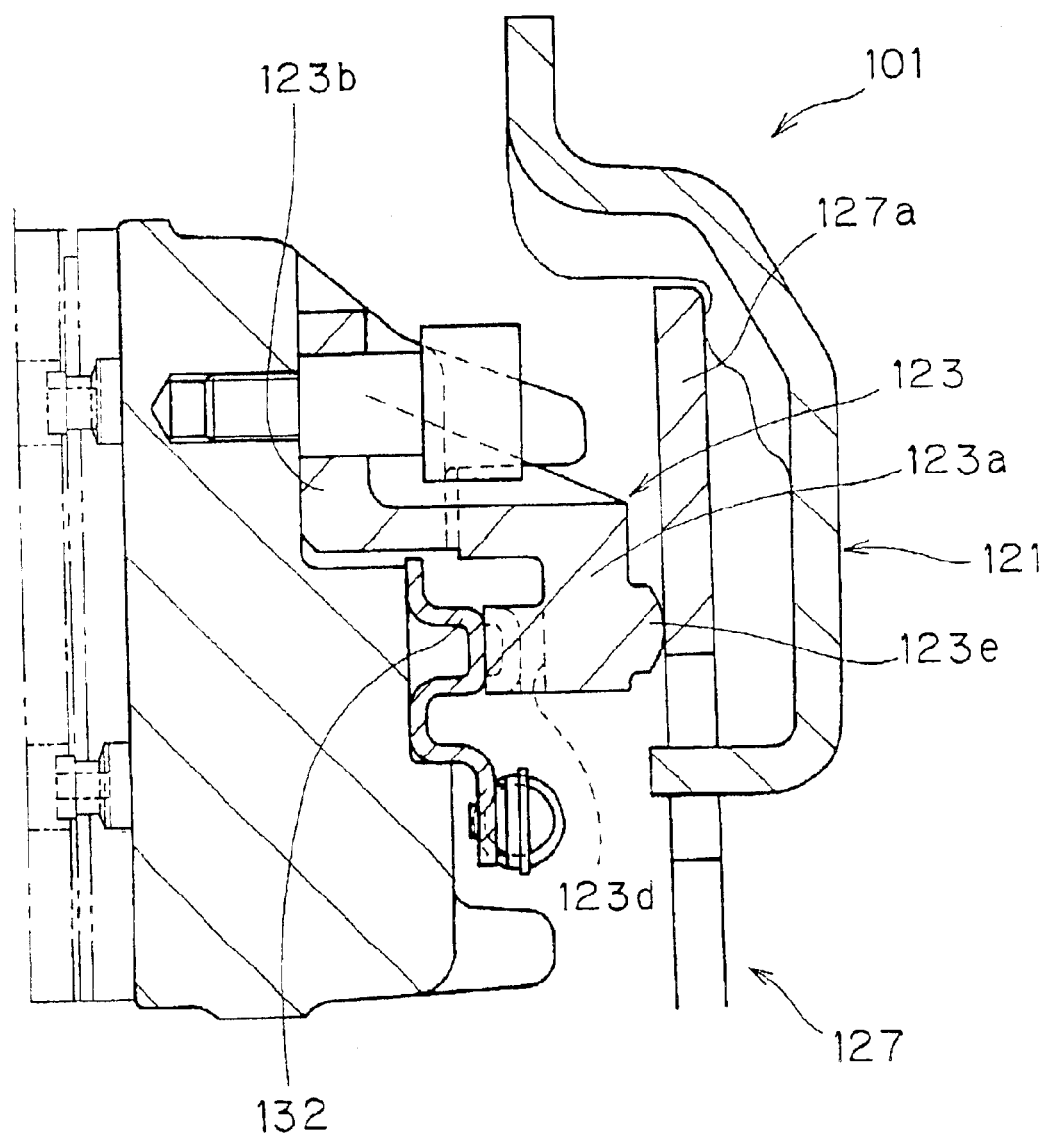
FIG. 21 is a fragmentary cross-sectional view of the clutch cover assembly of FIG. 20 taken along line IXX-0 in FIG. 20.
Figure 22:
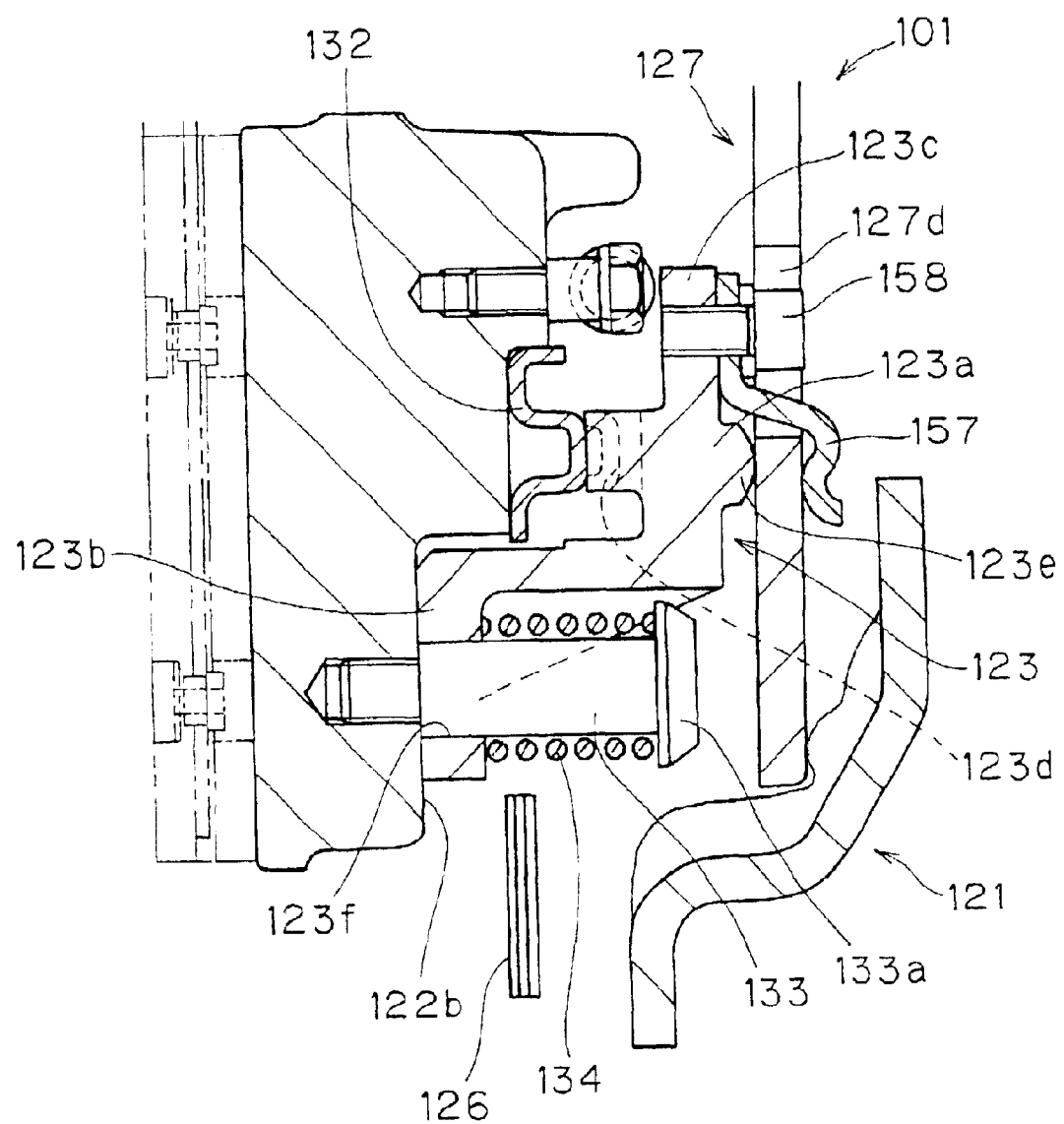
FIG. 22 is a fragmentary cross-sectional view of the clutch cover assembly of FIG. 20 taken along line 0-IXX' in FIG. 20.
Figure 23:
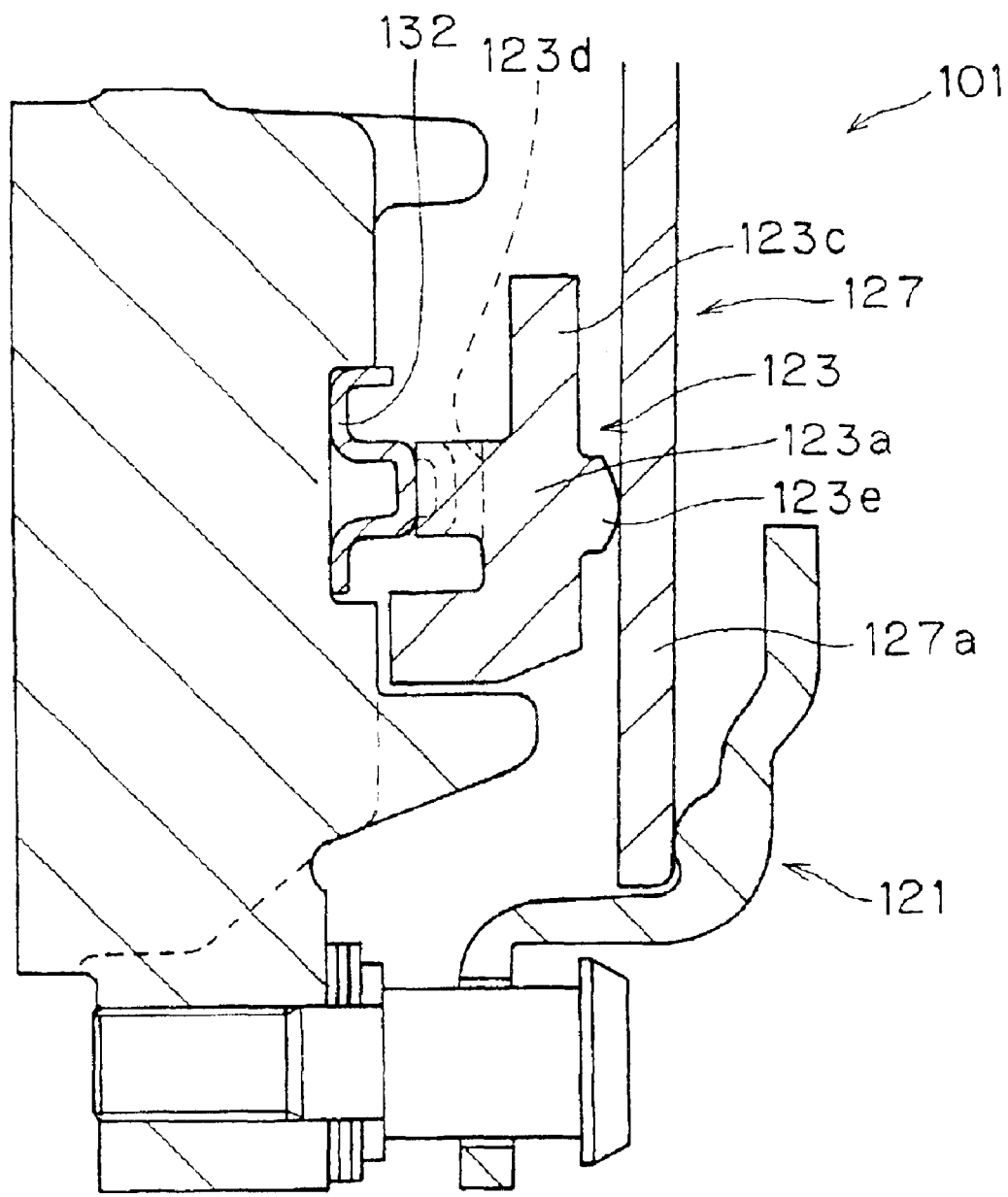
FIG. 23 is a fragmentary cross-sectional view of the clutch cover assembly of FIG. 20 taken along line 0-XXIII in FIG. 20.

A fulcrum ring 123 has a relatively large thickness, and is preferably formed of a cast member. As seen in FIGS. 21 and 22, the fulcrum ring 123 has an annular portion 123a, an outer peripheral portion 123b and a plurality of radially inward projections 123c. The annular portion 123a is provided at its engine side with an inclined surface 123d, which cooperates with a rotary plate 132 to form a wedge mechanism. The annular portion 123a is also provided at its transmission side with a projection 123e in contact with a diaphragm spring 127.

Figure 20:
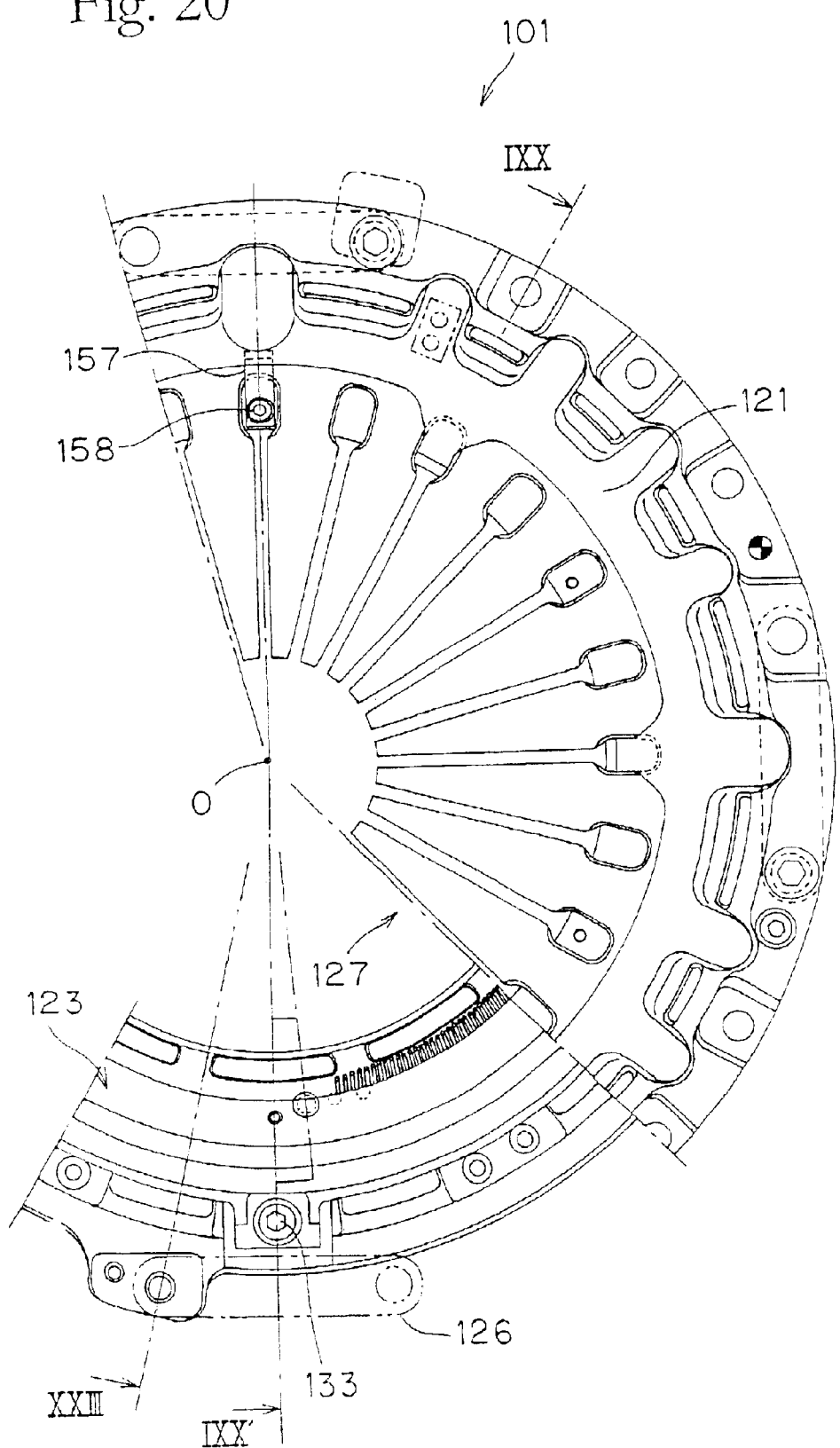
FIG. 20 is an elevational view of the clutch cover assembly of FIG. 19 with sections removed for illustrative purposes.

Referring to FIGS. 20 and 22, description will now be given on a mechanism for axially biasing the fulcrum ring 123 and a pressure plate 122 toward each other. This mechanism for the biasing is formed of the outer peripheral portion 123b of the fulcrum ring 123, a plurality of bolts 133, and a plurality of coil springs 134. The outer peripheral portion 123b is in contact with a radially outer portion of a second side surface 122b of the pressure plate 122. The outer peripheral portion 123b is provided with a plurality of, preferably four, axial through apertures 123f. The apertures 123f are formed corresponding to the strap plates 126, and therefore are preferably formed at circumferentially equally spaced four positions, respectively. In each aperture 123f, a bolt 133 and a coil spring 134 are arranged. The bolt 133 is engaged with the pressure plate 122, and has a shank axially extending through the aperture 123f in the fulcrum ring 123 toward the transmission. Therefore, a head 133a of the bolt 133 is axially spaced by a predetermined distance from the outer peripheral portion 123b of the fulcrum ring 123. The coil spring 134 is arranged around the shank of the bolt 133, and its axially opposite ends are in contact with the outer peripheral portion 123b of the fulcrum ring 123 and the head 133a of the bolt 133. In this state, the coil spring 134 is axially compressed to apply an elastic force directed axially toward the transmission to the bolt 133 and thus the pressure plate 123, and to apply an elastic force directed axially toward the engine to the fulcrum 123. The structure described above can achieve the same advantage as that achieved by the leaf springs in the foregoing embodiments.

In this embodiment, the advantage achieved by the provision of the leaf springs 35' is the same as that in the first embodiment. However, although first embodiment provides a simple structure, the first embodiment is more difficult to assemble relative to the second embodiment. In the second embodiment, it is merely required to fix the clips 57 by the bolts 58 in the final state of the assembly, and the assembling operation can be simple. According to the second embodiment, if the fulcrum ring 23' is formed of divided portions, the fixed block 56 can have a function of coupling the divided portions together.

Description will now be given on the structure for axially pulling and separating the fulcrum ring 123 from the pressure plate 122 in the wear compensating operation. As seen in FIGS. 21 and 22, the structure is formed of the radially inward projections 123c of the fulcrum ring 123, clips 157, and bolts 158. The clip 157 is formed of a small strip, and has an end fixed to the radially inward projection 123c by the bolt 158. The other end of the clip 157 is in contact with the surface of the diaphragm spring 127 on the transmission side. More specifically, the clip 157 extends axially through a substantially rectangular aperture 127d in the diaphragm spring 127. The clip 157 has an end in contact with the surface, on the transmission side, of the radially inner end (i.e., portion biasing the fulcrum ring 123) of an elastic portion 127a of the diaphragm spring 127. The advantage achieved by this structure is the same or similar to that of the second embodiment.

4. Fourth Embodiment (1) Basic Structure

Figure 24:
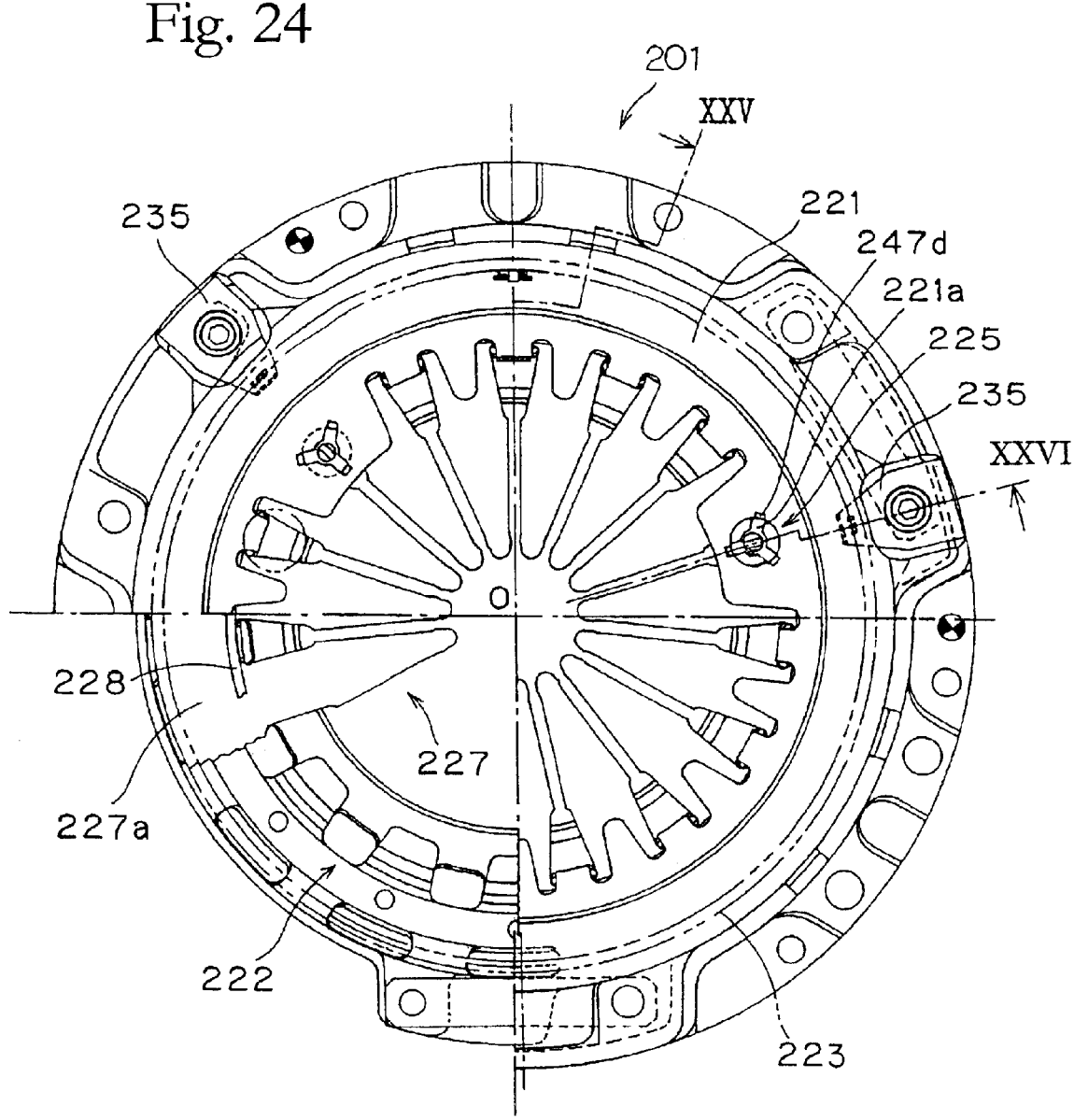
FIG. 24 is an elevational of a clutch cover assembly in accordance with a fourth preferred embodiment of the present invention with sections removed for illustrative purposes.
Figure 25:
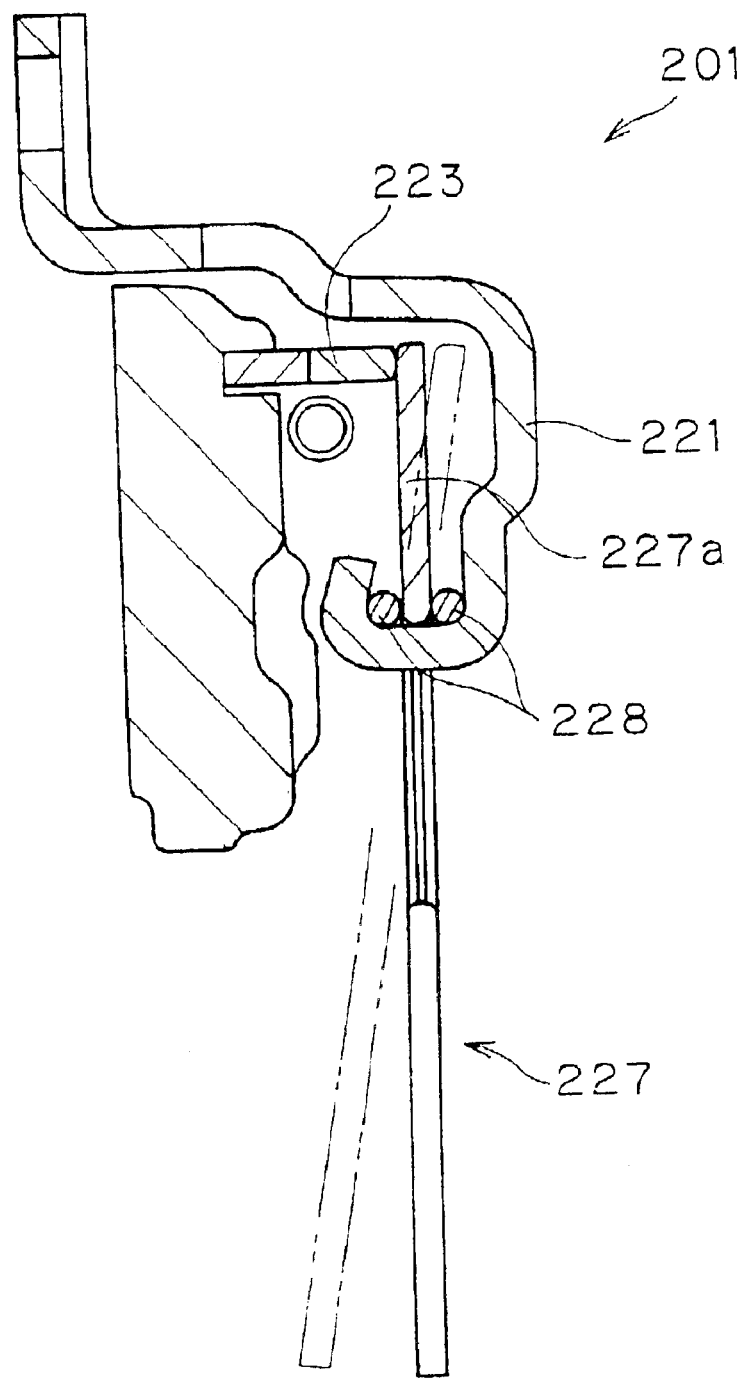
FIG. 25 is a fragmentary cross-sectional view of the clutch cover assembly of FIG. 24 taken along line segments from XXV to 0 in FIG. 24.
Figure 26:
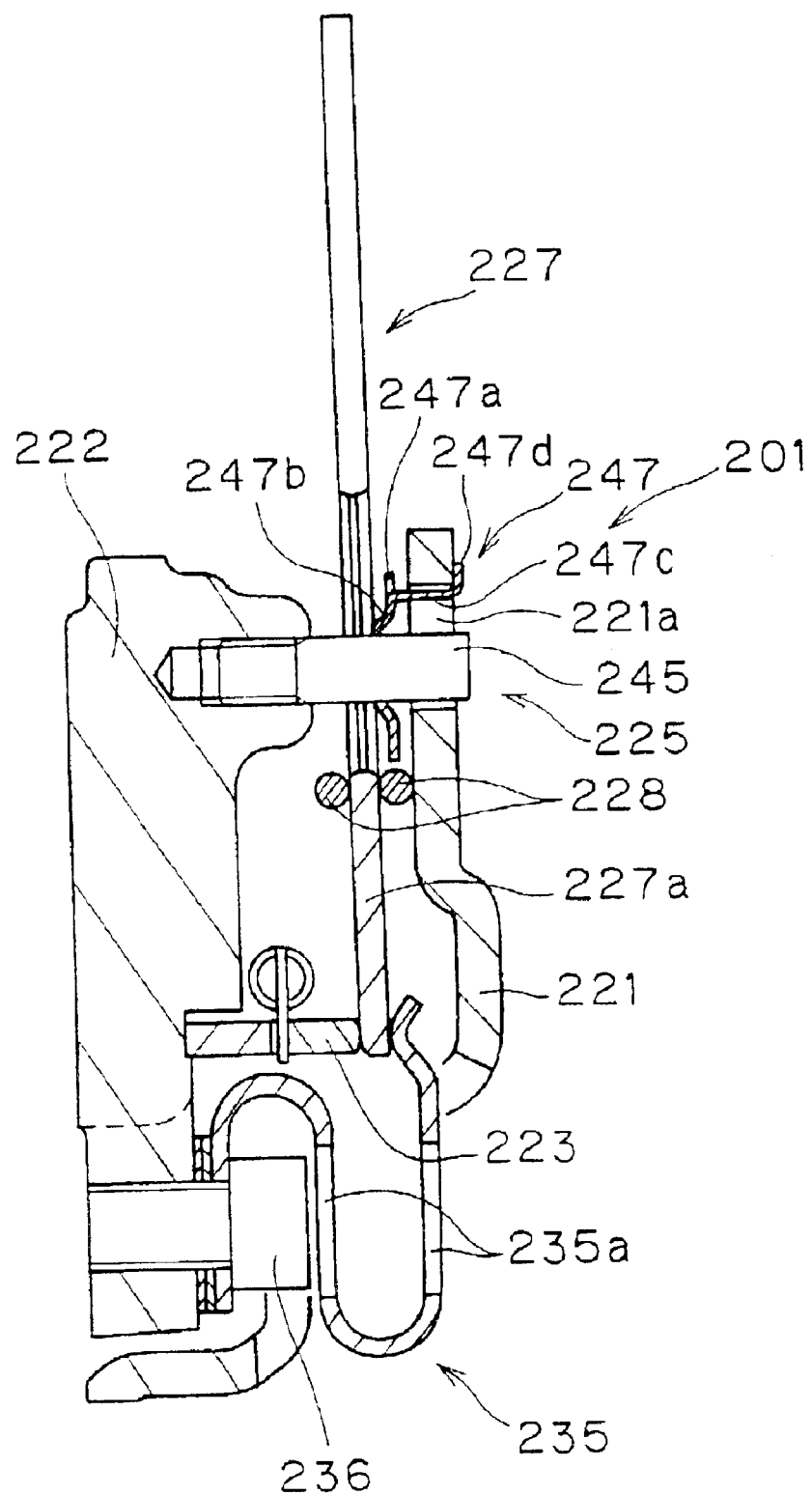
FIG. 26 is a fragmentary cross-sectional view of the clutch cover assembly of FIG. 24 taken along line segments from XXVI to 0 in FIG. 24.

FIGS. 24 to 26 show a clutch cover assembly 201 in accordance with a fourth preferred embodiment of the invention. A basic structure relating to the wear compensating mechanism of the clutch cover assembly 201 is substantially the same or similar to that in the first embodiment. The primary difference between the first and fourth embodiments of the present invention is that the fourth embodiment employs a push-type structure, in which the clutch release is performed by axially pushing an inner periphery of the diaphragm spring toward the engine in contrast to the first embodiment employing the pull-type structure.

A diaphragm spring 227 has an elastic portion 227a, of which an inner periphery is supported by a clutch cover 221 via two wire rings 228. An outer periphery of the elastic portion 227a is in contact with the surface of the fulcrum ring 223 on the transmission side.

(2) Structure for Biasing the Pressure Plate and the Fulcrum Ring

Similar to the first embodiment, a leaf spring 235 applies from its one end an elastic force to the fulcrum ring 223 via the diaphragm spring 227. More specifically, an end of the leaf spring 235 is in axial contact with the surface on the transmission side of the outer peripheral portion (i.e., pushing portion applying a pushing force to the fulcrum ring 223) of the elastic portion 227a of the diaphragm spring 227.

The leaf spring 235 is provided with two coaxial apertures 235a, through which a bolt 236 extends axially.

(3) Restricting Mechanism

Description will now be given on a restricting mechanism 225. The restricting mechanism 225 is formed of a combination of a bolt 245 and a washer 247, and these combinations are arranged in a plurality of, preferably three, circumferentially equally spaced positions, respectively.

As shown in FIG. 26, the bolt 245 is fixed to a side, preferably the transmission side, of the inner peripheral portion of a pressure plate 222. The bolt 245 is engaged with the pressure plate 222, and extends axially toward the transmission. The bolt 245 further extends through the rectangular aperture formed in the diaphragm spring 227 into an aperture 221a formed in the clutch cover 221. As shown in FIG. 24, the aperture 221a has a central portion of a circular form and three radial slits. The bolt 245 is arranged within the circular portion of the aperture 221a with an annular space around it. In contrast to the foregoing embodiments, the bolt 245 does not have a head with a large diameter.

As shown in FIGS. 27 and 28, the washer 247 is formed of an annular plate member. The washer 247 has a central aperture for engagement with the bolt 245. More specifically, the washer 247 is formed of an circular plate portion 247a, a conical portion 247b and, a plurality of engagement claws 247c. The conical portion 247b extends radially inward from the inner periphery of the circular plate portion 247a. As seen in FIG. 26, the plurality of engagement claws 247c extends axially toward the transmission from the outer periphery of the circular plate portion 247a. The washer 247 is primarily arranged axially between the clutch cover 221 and the diaphragm spring 227. The conical portion 247b of the washer 247 has a radially inner end, which projects axially toward the engine and is in contact with the shank of the bolt 245. Further, the engagement claws 247c axially extend through radially outer portions of the slits of the apertures 221a in the clutch cover 221, respectively. Each engagement claw 247c is provided at its end with a radially outward claw 247d. Each claw 247d is in contact with the surface on the transmission side of the clutch cover 221. In this state, the circular plate portion 247a of the washer 247 is spaced by a predetermined distance from the surface on the engine side of the clutch cover 221.

The function of the restricting mechanism 225 is substantially the same as the function of the restricting mechanisms of the foregoing embodiments, and therefore will now be described only briefly. When the wear occurs in the clutch engaged state, the pressure plate 222 and the fulcrum ring 223 axially move relatively to the clutch cover 221 toward the engine. In this operation, the bolt 245 moves together with the pressure plate 222, and receives a slide load from the washer 247. In the clutch released state, the strap plates (not shown) move the pressure plate 222 and the fulcrum ring 223 away from the clutch disk. When the circular plate portion 247a of the washer 247 is in contact with the clutch cover 221, the washer 247 applies a lock load to the bolt 245 so that the pressure plate no longer moves.

As described above, the washer 247 of the restricting mechanism 225 corresponds to a member integrally having all the functions of the bushing 46, conical spring 49, snap ring 50 and others in the restricting mechanism 25 of the first embodiment. Therefore, the number of required parts can be small, and the structure can be simple. Consequently, the cost can be low.

5. Fifth Embodiment

Figure 29:
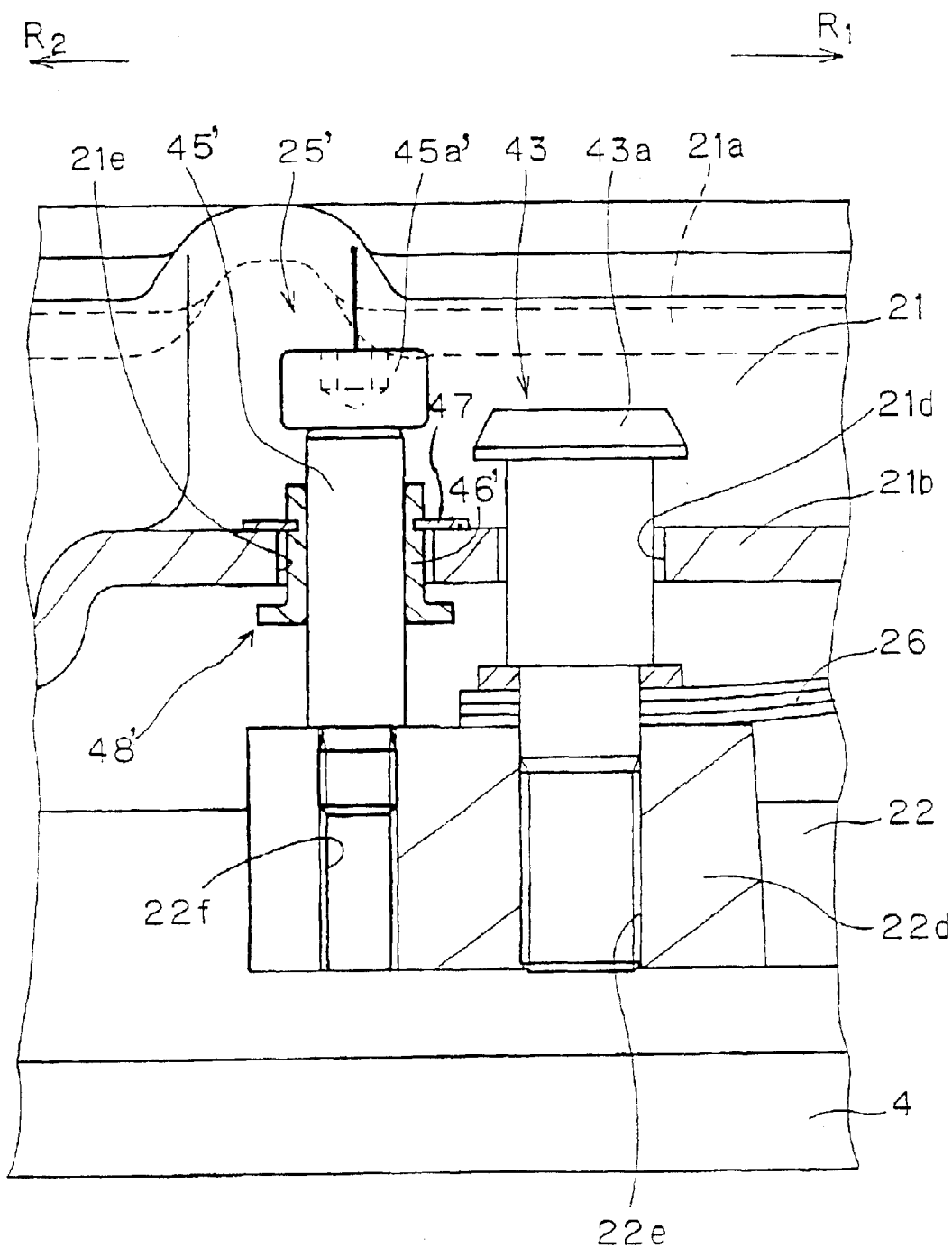
FIG. 29 is a cross-sectional plan view of a restricting mechanism in accordance with a fifth preferred embodiment of the present invention.

Referring to FIG. 29, a restricting mechanism in accordance with a fifth preferred embodiment of the present invention will now be described.

A restricting mechanism 25' inhibits axial movement of the fulcrum ring 23 before the friction facings 11 are worn. When the friction facings 11 are worn, the restricting mechanism 25' detects the amount of such wear, and allows axial movement of the fulcrum ring 23 in accordance with the wear amount. More specifically, the restricting mechanism 25' serves as a mechanism for restricting the disengagement of the pressure plate 22, and restricts the movement of the pressure plate 22 away from the friction facing of the clutch disk 4 in the clutch release operation. The restricting mechanism 25' is arranged at the projection 22d of the pressure plate 22. The restricting mechanism 25' is formed of a bolt 45' and a bushing 46'. The bolt 45' is engaged with the second screw aperture 22f in the projection 22d. The bolt 45' extends axially toward the transmission through the second axial aperture 21e in the outer peripheral portion 21b of the clutch cover 21. The bushing 46' is formed of a spring member, which is provided at its circumferentially one position with an axial slit, and is frictionally engaged with an outer peripheral surface of the shank of the bolt 45. Further, the bushing 46' has a cylindrical form, and is fitted into the second axial aperture 21e in the clutch cover 21 for axial movement by a predetermined distance. A snap ring 47' is fixed to an end of the bushing 46' on the transmission side. The snap ring 47' has an outer diameter larger than the diameter of the second axial aperture 21e, and is in contact with the surface of the clutch cover 21 on the transmission side. The bushing 46' is provided at its end on the engine side with a radially outward flange 48'. The flange 48' has a circular form, and a predetermined axial space is maintained between the flange 48 and the surface on the engine side of the clutch cover 21. The axial length of this space provides a distance (release distance), by which the pressure plate 22 can move relatively to the clutch cover 21 when the state changes between the clutch engaged state and the clutch released state.

When the bolt 45' tends to move axially toward the engine with respect to the bushing 46' (i.e., when the friction facings 11 are worn in the clutch engaging operation), the bushing 46' applies a slide load to the bolt 45'. When the bolt 45' tends to move axially toward the transmission with respect to the bushing 46' (i.e., after the bushing 46' comes into contact with the clutch cover 21 in the clutch release operation), the bushing 46' applies a slide load to the bolt 45'.

In the first embodiment, the latter slide load of a sufficiently large increased magnitude unavoidably increases the former slide load so that the loss of the clutch pressing load increases to a slight extent. However, this embodiment provides a simple structure, and improves durability. Also, parts of the structure can be reduced in number.

6. Other Embodiments

Each of the embodiments already described uses a diaphragm spring for clutch engagement. However, other springs such as coil springs may be used. Instead of the structure, in which the spring is in direct contact with the pressure plate, the elastic force of the spring may be applied to the pressure plate via a lever member.

Instead of the elastic load, a hydraulic pressure or the like may be applied directly to the pressure plate as the set load.

In the clutch cover assembly according to the invention, the second elastic member biases the pressure plate and the fulcrum ring toward each other. Therefore, when the pressure plate undergoes acceleration due to vibrations applied to the clutch cover assembly in the clutch release operation, axial movement of the fulcrum ring away from the pressure plate is suppressed. Thus, the over-adjustment phenomenon is suppressed in the clutch cover assembly.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-039828. The entire disclosure of Japanese Patent Application No. 2002-039828 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A clutch cover assembly for biasing a friction facing of a clutch disk assembly toward a flywheel to engage a clutch, comprising:
    a clutch cover being fixed to the flywheel;
    a pressure plate neighboring the friction facing, and having a first side surface opposed to the friction facing and a second side surface on an opposite side;
    a fulcrum ring being arranged on said second side surface of said pressure plate;
    a pushing member being supported by said clutch cover to apply a pushing force to said fulcrum ring toward said pressure plate;
    a biasing mechanism being configured to apply a load to said fulcrum ring to bias said fulcrum ring away from said pressure plate;
    a restricting mechanism being configured to restrict movement of said pressure plate away from the friction facing in a clutch release operation, to detect a wear amount of the friction facing, and to shift a stopping position of said pressure plate moved away from the friction facing in accordance with said wear amount toward the friction facing;
    a first elastic member being configured to bias said pressure plate away from the friction facing; and
    a second elastic member being configured to bias said pressure plate and said fulcrum ring axially toward each other.

2. The clutch cover assembly according to claim 1, wherein
    said pushing member is configured to apply a load in a direction opposite to a biasing direction to a portion of the second elastic member biasing said fulcrum ring when releasing the pushing force.

3. The clutch cover assembly according to claim 2, wherein
    said second elastic member is a plate spring, and
    said second elastic member biases said fulcrum ring toward said pressure plate via a pushing portion of said pushing member.

4. The clutch cover assembly according to claim 3, wherein
    said pushing member stops movement of said fulcrum ring away from said pressure plate during an operation of compensating wear in said clutch release operation.

5. The clutch cover assembly according to claim 3, wherein
    said plate spring has one end fixed to said pressure plate and an other end engaging with said pushing member.

6. The clutch cover assembly according to claim 5, wherein
    said plate spring has two curved portions connected to each other.

7. The clutch cover assembly according to claim 4, wherein
    said plate spring has one end fixed to said pressure plate and an other end engaging with said pushing member.

8. The clutch cover assembly according to claim 7, wherein
    said plate spring has two curved portions connected to each other.

9. The clutch cover assembly according to claim 5, wherein
    said fulcrum ring is formed with an abutting portion abutting with a pushing portion of said pushing member and a recessed portion having a space from said pushing portion of said pushing member, and
    a portion of said plate spring passes through said space.

10. The clutch cover assembly according to claim 7, wherein
    said fulcrum ring is formed with an abutting portion abutting with a pushing portion of said pushing member and a recessed portion having a space from said pushing portion of said pushing member, and
    a portion of said plate spring passes through said space.

11. The clutch cover assembly according to claim 1, wherein said second elastic member directly contacts said fulcrum ring, and said fulcrum ring is engaged with said pushing portion of said pushing member.

12. The clutch cover assembly according to claim 11, further comprising an engaging member fixed to said fulcrum ring and engaged with said pushing member opposite said fulcrum ring.

13. The clutch cover assembly according to claim 11, wherein said pushing member stops movement of said fulcrum ring away from said pressure plate during an operation of compensating wear in said clutch release operation.

14. The clutch cover assembly according to claim 11, wherein said second elastic member is a plate spring, and said second elastic member biases said fulcrum ring toward said pressure plate.

15. The clutch cover assembly according to claim 14, wherein said plate spring has one end fixed to said pressure plate and an other end engaging with said pushing member.

16. The clutch cover assembly according to claim 15, wherein said plate spring has two curved portions connected to each other.

17. The clutch cover assembly according to claim 11, wherein said second elastic member is a coil spring.

18. The clutch cover assembly according to claim 17, further comprising a support member extending axially from said second side surface of said pressure plate, said coil spring has one end supported by said support member and one end biasing said fulcrum ring toward said pressure plate.

19. The clutch cover assembly according to claim 18, wherein said support member is a bolt fixed to said pressure plate and extending through a hole in said fulcrum ring, said bolt having a head supporting said one end of said coil spring.

20. The clutch cover assembly according to claim 1, wherein said pushing member stops the movement of said fulcrum ring away from said pressure plate during an operation of compensating wear in said clutch release operation.

21. The clutch cover assembly according to claim 2, wherein said pushing member stops movement of said fulcrum ring away from said pressure plate during an operation of compensating wear in said clutch release operation.

* * * * *